US012624258B2

(12) United States Patent
Kakeya et al.

(10) Patent No.: US 12,624,258 B2
(45) Date of Patent: May 12, 2026

(54) ADHESIVE FILM AND METHOD FOR PRODUCING ADHESIVE FILM

(71) Applicant: MITSUBISHI GAS CHEMICAL COMPANY, INC., Tokyo (JP)

(72) Inventors: Fumiaki Kakeya, Tokyo (JP); Masahide Takeda, Tokyo (JP); Keisuke Tomita, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 317 days.

(21) Appl. No.: 17/428,379

(22) PCT Filed: Feb. 3, 2020

(86) PCT No.: PCT/JP2020/003935
§ 371 (c)(1),
(2) Date: Aug. 4, 2021

(87) PCT Pub. No.: WO2020/162395
PCT Pub. Date: Aug. 13, 2020

(65) Prior Publication Data

US 2022/0154045 A1 May 19, 2022

(30) Foreign Application Priority Data

Feb. 7, 2019 (JP) ................................ 2019-021056
Jul. 19, 2019 (JP) ................................ 2019-134128

(51) Int. Cl.
*C09J 7/50* (2018.01)
*C08G 18/24* (2006.01)
(Continued)

(52) U.S. Cl.
CPC .............. *C09J 7/50* (2018.01); *C08G 18/246* (2013.01); *C08G 18/673* (2013.01);
(Continued)

(58) Field of Classification Search
None
See application file for complete search history.

(56) References Cited

U.S. PATENT DOCUMENTS

2005/0249946 A1 11/2005 Hsu et al.
2008/0138531 A1* 6/2008 Laginess .................. C09D 4/00 427/508
(Continued)

FOREIGN PATENT DOCUMENTS

CN 206501529 U * 9/2017
CN 107298936 A * 10/2017 ........... C09D 101/14
(Continued)

OTHER PUBLICATIONS

"Physical Properties and Applications of Polymer Nanocomposites", Table 4.2, Woodhead Publishing (Year: 2010).*
(Continued)

*Primary Examiner* — Scott R. Walshon
(74) *Attorney, Agent, or Firm* — GREENBLUM & BERNSTEIN, P.L.C.

(57) ABSTRACT

An adhesive film or the like which is a laminate containing a substrate film containing a polycarbonate, a primer layer laminated on the surface of the substrate film, and an adhesive layer laminated on the surface of the primer layer opposite the substrate film.

15 Claims, 2 Drawing Sheets

(51) Int. Cl.

| | |
|---|---|
| ***C08G 18/67*** | (2006.01) |
| ***C08G 18/76*** | (2006.01) |
| ***C09J 7/25*** | (2018.01) |
| ***C09J 7/29*** | (2018.01) |
| ***C09J 7/30*** | (2018.01) |

(52) U.S. Cl.

CPC ............ *C08G 18/7614* (2013.01); *C09J 7/25* (2018.01); *C09J 7/29* (2018.01); *C09J 7/30* (2018.01); *C09J 2203/318* (2013.01); *C09J 2301/122* (2020.08); *C09J 2301/162* (2020.08); *C09J 2301/30* (2020.08); *C09J 2301/416* (2020.08)

(56) References Cited

U.S. PATENT DOCUMENTS

| | | | | |
|---|---|---|---|---|
| 2009/0161058 | A1* | 6/2009 | Sherman | B32B 27/281 349/153 |
| 2015/0053341 | A1 | 2/2015 | Chen-Ho et al. | |
| 2016/0108292 | A1* | 4/2016 | Yamakami | C09J 7/26 428/220 |
| 2016/0185925 | A1* | 6/2016 | Noda | B32B 27/16 427/551 |
| 2016/0230048 | A1 | 8/2016 | Edmonds et al. | |
| 2017/0267014 | A1 | 9/2017 | Chen-Ho et al. | |
| 2017/0278739 | A1* | 9/2017 | Akutsu | B32B 27/308 |
| 2017/0320295 | A1 | 11/2017 | Fukuda et al. | |
| 2019/0211168 | A1 | 7/2019 | Thompson et al. | |

FOREIGN PATENT DOCUMENTS

| | | | | |
|---|---|---|---|---|
| CN | 109311289 | A | 5/2019 | |
| EP | 1306399 | A1 * | 5/2003 | C08G 18/8116 |
| JP | 10-330716 | A | 12/1998 | |
| JP | 2003-213230 | A | 7/2003 | |
| JP | 2006-28347 | A | 2/2006 | |
| JP | 2010-126594 | A | 6/2010 | |
| JP | 2015-166192 | A | 9/2015 | |
| JP | 2016-539202 | A | 12/2016 | |
| JP | 2017-52251 | A | 3/2017 | |
| JP | 6087298 | B2 | 3/2017 | |
| JP | 2017-72815 | A | 4/2017 | |
| JP | 2017-95605 | A | 6/2017 | |
| JP | 2017-144624 | A | 8/2017 | |
| JP | 2017-200975 | A | 11/2017 | |
| JP | 2018-65259 | A | 4/2018 | |
| JP | 2018-172562 | A | 11/2018 | |
| WO | 2012/162053 | A2 | 11/2012 | |
| WO | 2013/115310 | A1 | 8/2013 | |
| WO | 2016/158827 | A1 | 10/2016 | |
| WO | WO-2020100382 | A1 * | 5/2020 | G02B 5/02 |

OTHER PUBLICATIONS

Machine translation of CN 206501529 U (Year: 2024).*

Machine Translation of CN-107298936 A Description (Year: 2025).*

Extended European Search Report issued to the corresponding European Patent Application No. 20752293.9 dated Aug. 30, 2022.

International Search Report issued in International Patent Application No. PCT/JP2020/003935, dated Mar. 31, 2020, along with an English translation thereof.

Written Opinion of the International Searching Authority issued in International Patent Application No. PCT/JP2020/003935, dated Mar. 31, 2020, along with an English translation thereof.

Office Action dated Apr. 28, 2022 in Chinese family member application No. 202080012544.3 and partial English language (machine) translation thereof.

Office Action that issued in corresponding European Patent Application No. 20752293.9, dated Apr. 11, 2024.

Office Action issued in EP Patent Application No. 20752293.9, Jul. 31, 2025.

Technibond: Substrates Surface Energy, Oct. 17, 2021, XP093296421, retrieved from Internet: https://www.technibond.co.uk/wp-content/uploads/2019/04/surface-energy-chart.pdf.

Bomar Difunctional Aliphatic Polyether Urethane Acrylate, Oct. 27, 2014, XP093296623, retrieved from Internet: https://bomar-chem.com/brandfolder/download?fieldIdentifier=file&contentId=755&filename=asseetFilePlaceholder.pdf.

* cited by examiner

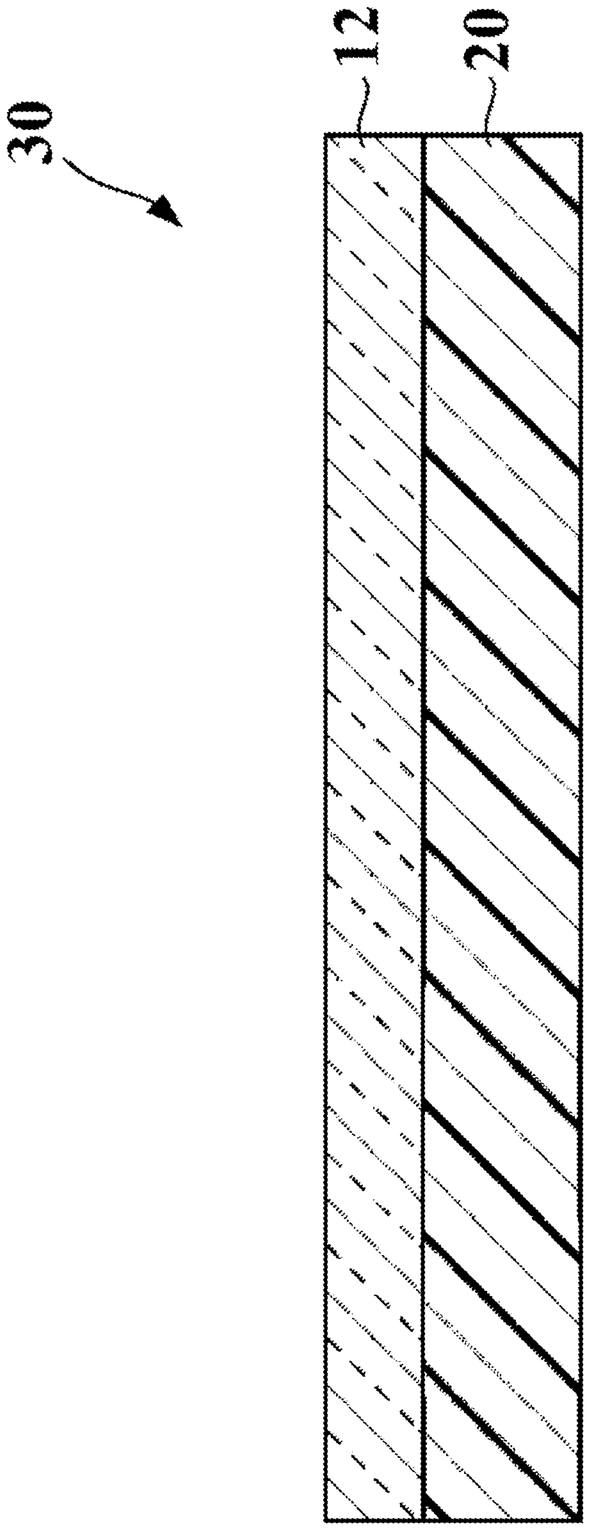
Related Art
[Figure 2]

ADHESIVE FILM AND METHOD FOR PRODUCING ADHESIVE FILM

TECHNICAL FIELD

The present invention relates to an adhesive film comprising a substrate film that contains a polycarbonate, a primer layer and an adhesive layer, to a laminate comprising the adhesive film and to a method for fabricating the adhesive film.

BACKGROUND ART

Polycarbonate resins are excellent in terms of transparency, shock resistance, heat resistance, flexibility in processing, light weight and the like. Therefore, polycarbonate resins are widely used, for example, as meter covers and liquid crystal display covers in electric, electronic or office automation equipment and the like, for usage in automobiles including glass windows, sunroofs and meter covers, and as construction materials (see, for example, Patent document 1).

Meanwhile, adhesive films including a polycarbonate resin layer and an adhesive layer bonding thereto that bonds tightly enough to prevent delamination thereof are known (see, for example, Patent documents 2 and 3). Since a highly adhesive layer is used for producing such an adhesive film, a process of transferring an adhesive sheet that has been molded on a separator in advance onto a polycarbonate substrate is usually employed (see, for example, Patent document 2). Hereinafter, the process of transferring an adhesive sheet onto a substrate is also referred to as a transfer process.

PRIOR ART DOCUMENTS

Patent Documents

Patent document 1: Japanese Unexamined Patent Application Publication No. 2010-126594
Patent document 2: WO2016/158827
Patent document 3: Japanese Unexamined Patent Application Publication No. 2017-200975

SUMMARY OF THE INVENTION

Problems to be Solved by the Invention

Polycarbonate resins do not necessarily have favorable surface properties like surface hardness, solvent resistance and the like. For example, a film containing a polycarbonate is likely to cause problems such as surface whitening, swelling or the like upon contact with a solvent. Therefore, a step of protecting the surface of such a polycarbonate-containing film may be required.

For example, if an adhesive agent layer is to be formed on a surface of a polycarbonate resin film by a transfer process, it requires a step of bringing the surface of the polycarbonate resin film into contact with an adhesive layer which is formed by applying and drying an adhesive agent coating material containing a solvent on a surface of a film made of a resin having satisfactory solvent resistance such as polyethylene terephthalate to transfer the adhesive layer onto the surface of the polycarbonate resin film.

Such a step impairs convenient production of an adhesive film, and even with such a step, the surface of the polycarbonate resin film may be deteriorated by the solvent component remaining in the adhesive agent coating material.

Thus, the objectives of the present invention are to provide an adhesive film having an adhesive layer, which can be produced by a convenient process and which can reliably protect a layer containing a polycarbonate resin, to provide a laminate including the adhesive film, and to provide a method for fabricating the adhesive film.

Means for Solving the Problems

In order to solve the above-described problem, the present inventors have gone through extensive research, and as a result of which found that an adhesive film can protect a surface of a substrate film containing a polycarbonate while having excellent adhesiveness when it is formed by providing a primer layer having a prescribed component onto the surface of the substrate film and then providing an adhesive layer thereon, thereby accomplishing the present invention.

Thus, the present invention comprises the followings.

(1) An adhesive film which is a laminate comprising: a substrate film containing a polycarbonate; a primer layer laminated at least on a surface of one side of the substrate film; and an adhesive layer laminated on a surface of the primer layer on the other side from the substrate film.

(2) The adhesive film according to (1) above, wherein the primer layer comprises a urethane acrylate resin.

(3) The adhesive film according to (2) above, wherein the urethane acrylate resin is a UV curable urethane acrylate having a molecular structure with cyclic skeleton.

(4) The adhesive film according to (2) above, wherein the urethane acrylate resin contains at least a mixture of a hexafunctional urethane acrylate and a bifunctional acrylate.

(5) The adhesive film according to (2) above, wherein the urethane acrylate resin has an isocyanate-derived structural unit and a structural unit derived from a compound having a (meth)acryloyloxy group and a hydroxy group.

(6) The adhesive film according to any one of (1)-(5) above, wherein the surface of the primer layer on the adhesive layer side has a wetting index of 30 (mN/m) or more in accordance with JISK6768.

(7) The adhesive film according to any one of (1)-(6) above, wherein the adhesive layer contains at least one of a silicone adhesive agent, an acrylic adhesive agent and a urethane adhesive agent.

(8) The adhesive film according to any one of (1)-(7) above, wherein the thickness of the primer layer is 2 μm or more but less than or equal to 10 μm.

(9) The adhesive film according to any one of (1)-(8) above, wherein the primer layer contains any of an antistatic agent, an UV shielding agent, a near-infrared shielding agent, a light diffusion agent and metal particles.

(10) The adhesive film according to any one of (1)-(9) above, wherein the thickness of the adhesive layer is 10 μm or more but less than or equal to 100 μm.

(11) The adhesive film according to any one of (1)-(10) above, wherein the thickness of the substrate film is 30 μm or more but less than or equal to 200 μm.

(12) The adhesive film according to any one of (1)-(11) above, wherein the thickness of the adhesive film is 40 μm or more but less than or equal to 300 μm.

(13) The adhesive film according to any one of (1)-(12) above, wherein the adhesive film has peel adhesion of 0.001 (N/25 mm) or more but less than or equal to 3 (N/25 mm) in a peel test where the film is laminated on a polycarbonate mirror-finished film having a thickness of 0.05 (mm) in an environment of 23° C. and relative humidity of 50%, and then peeled off in the 180° direction at 152 mm/min.

(14) The adhesive film according to any one of (1)-(13) above, wherein the glass transition temperature of the substrate film is higher than 140° C. but lower than 160° C.

(15) The adhesive film according to any one of (1)-(14) above, wherein the refractive index of the resin composing the substrate film is 1.55-1.65.

(16) A method for fabricating the adhesive film according to any one of (1)-(15) above, the method comprising:

a primer layer forming step in which a primer solution is applied onto a surface of a substrate film containing a polycarbonate to form a primer layer; and an adhesive layer forming step in which an adhesive agent is applied to the surface of the primer layer on the other side from the substrate film to form an adhesive layer.

(17) A laminate comprising a molded resin body and the adhesive film according to any one of (1)-(15) above attached to the molded resin body.

(18) The laminate according to (17) above, wherein the molded resin body is a polycarbonate film.

(19) The laminate according to (17) above, wherein the molded resin body is a polyimide film.

Advantageous Effect of the Invention

The present invention described above can provide an adhesive film which has excellent adhesiveness and which can reliably protect a polycarbonate resin layer, for example, from deterioration caused by a solvent component. In addition, according to the present invention, an adhesive film having excellent characteristics such as a highly adhesive layer can be produced by a simple process.

Since an adhesive film of the present invention has excellent characteristics as described above, it can be used favorably, for example, for application to a surface of a display unit of a computer, a television, a plasma display or the like, a surface of a polarizer of a liquid crystal display device, and the like.

BRIEF DESCRIPTION OF THE DRAWINGS

FIG. 2 A cross-sectional view showing a laminate structure of an adhesive film of a comparative example.

EMBODIMENTS FOR CARRYING OUT THE INVENTION

Figure 1:
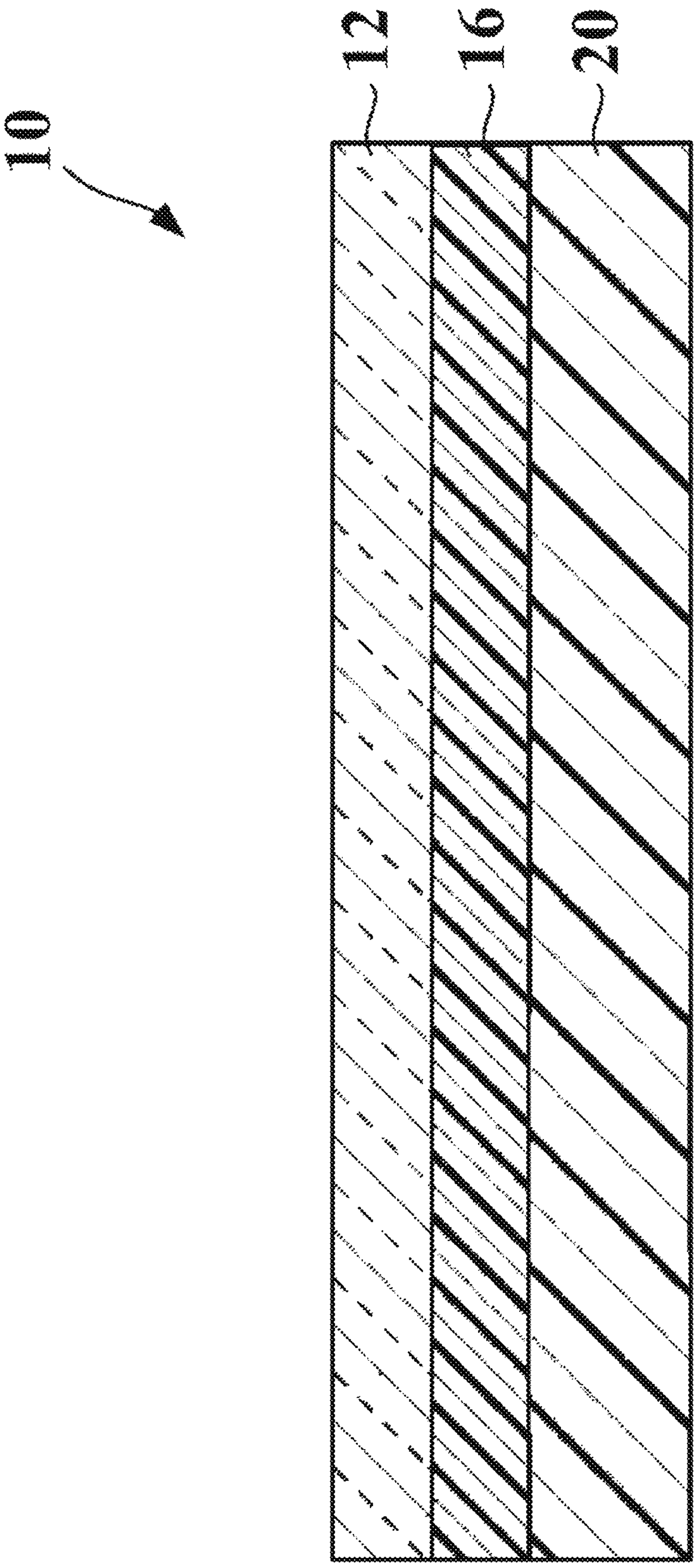
FIG. 1 A cross-sectional view showing the laminate structure of the adhesive film of Example 1.

Hereinafter, the present invention will be described in detail. Here, the present invention is not limited to the following embodiments and may be modified and carried out in any way within the scope that results the effect of the invention.

[Adhesive Film]

An adhesive film of the present invention is a laminate which has at least the following layers. Specifically, the adhesive film comprises a substrate film containing at least a polycarbonate resin, a primer layer laminated at least on a surface of one side of the substrate film, and an adhesive layer laminated on a surface of the primer layer on the other side from the substrate film.

While the thickness of the adhesive film, that is, the total thickness of these layers, is not particularly limited, it is, for example, 5 μm or more but less than or equal to 2,000 μm, preferably 10 μm or more but less than or equal to 1000 μm, more preferably 20 μm or more but less than or equal to 500 μm, and particularly preferably 40 μm or more but less than or equal to 300 μm. As long as the thickness of the adhesive film lies within this range, favorable appearance, sticking processibility and sticking processibility on curved surfaces can be achieved easily.

Hereinafter, each of the layered members included in the adhesive film, i.e., a laminate, will be described.

[Substrate Film]

A substrate film included in the adhesive film contains a polycarbonate (PC) resin. The substrate film may contain a component other than the polycarbonate resin, for example, a thermoplastic resin. While the kind of the thermoplastic resin is not particularly limited, examples thereof include, in addition to PC resins, acrylic resins such as polymethyl methacrylate (PMMA), and various resins such as polyethylene terephthalate (PET), triacetylcellulose (TAC), polyethylene naphthalate (PEN), polyimide (PI), a cycloolefin copolymer (COC), a norbornene-based resin, polyethersulfone, cellophane and an aromatic polyamide.

While the kind of the polycarbonate resin contained in the substrate film is not particularly limited as long as it contains a —[O—R—OCO]— unit which contains a carbonate ester bond in the molecular main chain (where R comprises an aliphatic group, an aromatic group or both of an aliphatic group and an aromatic group, and which further has a linear structure or a branched structure), it is preferably a polycarbonate having a bisphenol backbone or the like, and particularly preferably a polycarbonate having a bisphenol A backbone or a bisphenol C backbone. The polycarbonate resin may be a mixture or a copolymer of bisphenol A and bisphenol C. A bisphenol C-based polycarbonate resin, for example, a polycarbonate resin composed solely of bisphenol C, or a polycarbonate resin composed of a mixture or a copolymer of bisphenol C and bisphenol A can be used to enhance hardness of the substrate film.

Furthermore, the viscosity-average molecular weight of the polycarbonate resin is preferably 15,000-40,000, more preferably 20,000-35,000, and still more preferably 22,500-25,000.

In addition, the substrate film may contain an additive as a component other than the thermoplastic resin, where examples thereof include at least one kind of additive selected from the group consisting of a thermal stabilizer, an antioxidant, a flame retardant, a flame retardant auxiliary agent, a UV absorber, a mold release agent and a colorant such as a dye and a pigment. In addition, an antistatic agent, an antiblocking agent, a UV absorber (an UV shielding agent), a near-infrared shielding agent, a light diffusion agent, a fluorescent brightener, an antifog agent, a fluidity improving agent, a plasticizer, a dispersant, an antibacterial agent or the like may be added to the substrate film.

Addition of an antistatic agent to the substrate film or formation of an antistatic layer having an antistatic agent on a surface of the substrate film, preferably on the surface of the substrate film on the other side from the primer layer, can stabilize resistivity of the surface of the substrate film for a long time and can enhance the antistatic property. Thus, a substrate film that has been subjected to a treatment with an antistatic agent, or a substrate film which is a laminate having an antistatic layer laminated thereon can be used to suppress static electricity building up on the surface of the adhesive film.

Accordingly, the process of imparting an antistatic property to the substrate film is not particularly limited and a conventionally known process can be employed. Examples of such a process include a process in which an antistatic resin containing a resin component and an antistatic agent, a conductive polymer or a conductive resin containing a conductive substance is applied to a surface of the substrate film, a process in which a conductive substance is deposited or plated, and a process in which a substrate film is formed using a material kneaded with an antistatic agent.

When a substrate film having an antistatic layer layered thereon is used, the antistatic layer preferably contains the above-described polycarbonate resin in addition to an antistatic agent, it may also contain other resin, for example, as a binder. Examples of a resin other than the polycarbonate resin contained in the antistatic layer include one or more kinds of resins selected from a polyolefin resin, a polyurethane resin, an acrylic resin, an acrylic urethane resin, an acrylic styrene resin, an acrylic silicone resin, a silicone resin, a fluorine resin, a styrene resin, an alkyd resin, an amide resin, a polysilazane resin and the like, and a modified or a copolymer resin thereof. The component other than the antistatic agent contained in the antistatic layer is preferably only a polycarbonate resin, where the polycarbonate resin is contained in the antistatic layer, for example, preferably at 80 mass % or more, more preferably at 90 mass % or more and still more preferably at 95 mass % or more relative to the whole component other than the antistatic agent.

The antistatic agent is preferably contained in the substrate film at 0.1 mass % or more but less than or equal to 10 mass % relative to the total mass of the substrate film. More preferably, the content of the antistatic agent in the substrate film is 0.5 mass % or more but less than or equal to 5.0 mass %, and still more preferably 1.0 mass % or more but less than or equal to 3.0 mass %. Moreover, in a case where an antistatic layer is provided on the substrate film to form a laminate, an antistatic agent is contained in the antistatic layer preferably at a content in the above-described range relative to the total mass of the antistatic layer.

As an antistatic agent contained in the substrate film, for example, an organic compound such as a glycerol ester, an alkylbenzene sulfonate, an ionic compound such as an ionic liquid or a metal salt like a alkali metal salt is preferably used. An antistatic agent containing an ionic compound can have an excellent antistatic property.

<Ionic Liquid as Antistatic Agent>

An ionic liquid as an antistatic agent is an antistatic agent composed of an anion selected from a sulfonimide anion containing a fluorine atom or a sulfonate anion containing a fluorine atom, and a cation selected from a phosphonium cation, an ammonium cation or an imidazolium cation.

Ionic liquids are favorable since they exert a high antistatic ability in a small amount. An ionic liquid preferably refers to a compound composed solely of ions with a melting point of 100° C. or lower.

The anion forming the antistatic agent is preferably selected from a sulfonimide anion containing a fluorine atom or a sulfonate anion containing a fluorine atom. Examples of a favorable antistatic agent specifically include ionic liquids containing an anion selected from a perfluoroalkyl sulfonimide anion or a perfluoroalkyl sulfonate anion.

Preferably, the sulfonimide anion containing a fluorine atom is represented by Formula (1).

(1)

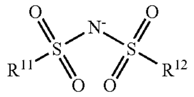

(in Formula (1), $R^{11}$ and $R^{12}$ each independently represent a hydrocarbon group containing a fluorine atom.)

$R^{11}$ and $R^{12}$ are preferably any of a linear, branched or cyclic alkyl group containing a fluorine atom, a linear, branched or cyclic alkylene group containing a fluorine atom or an aryl group containing a fluorine atom, more preferably a linear or branched alkyl group containing a fluorine atom, and still more preferably a linear alkyl group containing a fluorine atom.

The number of carbons composing the hydrocarbon group in $R^{11}$ and $R^{12}$ is preferably 1-10, more preferably 1-6, and still more preferably 1-3.

More specifically, $R^{11}$ and $R^{12}$ are preferably each independently a perfluorohydrocarbon group, more preferably a perfluoroalkyl group, still more preferably a perfluoromethyl group or a perfluoroethyl group, and yet still more preferably a perfluoromethyl group.

$R_{11}$ and $R_{12}$ may be identical or different, preferably identical.

Preferably, the sulfonate anion containing a fluorine atom is represented by Formula (2).

(2)

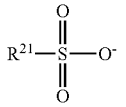

(in Formula (2), $R^{21}$ represents a hydrocarbon group containing a fluorine atom.)

The hydrocarbon group composing $R^{21}$ is preferably any of a linear, branched or cyclic alkyl group containing a fluorine atom, a linear, branched or cyclic alkylene group containing a fluorine atom and an aryl group containing a fluorine atom, more preferably a linear or branched alkyl group containing a fluorine atom, and still more preferably a linear alkyl group containing a fluorine atom.

The number of carbons composing the hydrocarbon group in $R^{21}$ is preferably 1-10, more preferably 1-6, still more preferably 2-6, and yet still more preferably 3-5.

Specifically, $R^{21}$ is more preferably an alkyl group having terminal $CF_3$-(trifluoromethyl group) or $CHF_2$-(difluoromethyl group), still more preferably a C2-C6 perfluoroalkyl group, and yet still more preferably a perfluoropropyl group or a perfluorobutyl group.

Examples of a cation serving as an antistatic agent include ionic liquids which compose a cation selected from a phosphonium cation, an ammonium cation and an imidazolium cation.

Preferably, the phosphonium cation is represented by Formula (3).

(3)

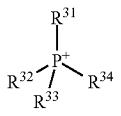

(in Formula (3), $R^{31}$-$R^{34}$ each independently represent a hydrocarbon group.)

$R^{31}$-$R^{34}$ are preferably each independently any of a linear, branched or cyclic alkyl group, a linear, branched or cyclic alkylene group or an aryl group, more preferably a linear or branched alkyl group, and still more preferably a linear alkyl group. $R^{31}$-$R^{34}$ may have a substituent.

The number of carbons composing the hydrocarbon group in $R^{31}$-$R^{34}$ is preferably 1-20, and more preferably 2-15. Still more preferably, three of $R^{31}$-$R^{34}$ are C2-C9 alkyl groups while the remaining one is a C10-C20 alkyl group, yet still more preferably three of $R^{31}$-$R^{34}$ are C4-C8 alkyl groups while the remaining one is a C12-C16 alkyl group, and still more preferably three of $R^{31}$-$R^{34}$ are hexyl groups while the remaining one is a C12-C16 alkyl group.

Preferably, the ammonium cation is represented by Formula (4).

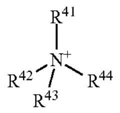
(4)

(in Formula (4), $R^{41}$-$R^{44}$ each independently represent a hydrocarbon group.)

$R^{41}$-$R^{44}$ are preferably any of a linear, branched or cyclic alkyl group, a linear, branched or cyclic alkylene group, or an aryl group, more preferably a linear or branched alkyl group, and still more preferably a linear alkyl group. $R^{41}$-$R^{44}$ may have a substituent.

The number of carbons composing the hydrocarbon group in $R^{41}$-$R^{44}$ is preferably 1-10, and more preferably 1-6.

Specifically, $R^{41}$-$R^{44}$ are preferably each independently a methyl group, an ethyl group, a propyl group, a butyl group, a pentyl group or a hexyl group, and more preferably, three of $R^{41}$-$R^{44}$ are methyl groups or ethyl groups while the remaining one is a propyl group, a butyl group or a pentyl group.

Preferably, the imidazolium cation is represented by Formula (5).

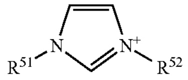
(5)

(in Formula (5), $R^{51}$ and $R^{52}$ each independently represent a hydrocarbon group.)

$R^{51}$ and $R^{52}$ are preferably any of a linear, branched or cyclic alkyl group, a linear, branched or cyclic alkylene group or an aryl group, more preferably a linear or branched alkyl group, and still more preferably a linear alkyl group. $R^{51}$-$R^{54}$ may have a substituent.

The number of carbons composing the hydrocarbon group in $R^{51}$ and $R^{52}$ is preferably 1-10, and more preferably 1-6.

Specifically, $R^{51}$ and $R^{52}$ are preferably each independently a methyl group, an ethyl group, a propyl group, a butyl group, a pentyl group or a hexyl group, and more preferably $R^{51}$ is a methyl group or an ethyl group while $R^{52}$ is a propyl group, a butyl group or a pentyl group.

While the antistatic agent is preferably composed of the above-mentioned anions and cations, examples of a particularly favorable combination include a combination of a sulfonimide anion containing a fluorine atom with either a phosphonium cation or an ammonium cation, and a combination of a sulfonate anion containing a fluorine atom with a phosphonium cation or an imidazolium cation.

The surface resistivity (Ω) of the substrate film imparted with the antistatic ability as described above is preferably less than $1.0\times10^{13}$, and more preferably less than $5.0\times10^{12}$.

Moreover, the surface resistivity (Ω) measured on the surface of the antistatic layer is preferably $5.0\times10^{7}$ or more, more preferably $1.0\times10^{8}$ or more, and still more preferably $1.0\times10^{9}$ or more.

<Antistatic Component in Adhesive Layer>

The composition of the adhesive layer of the adhesive film of the present invention also preferably contains an antistatic component (an antistatic agent), and more preferably contains an ionic compound as the antistatic component. Examples of the ionic compound include an alkali metal salt and/or an ionic liquid. These ionic compounds can be contained to impart an excellent antistatic property to the adhesive layer. An adhesive layer (that uses an antistatic component) obtained by crosslinking a composition containing an antistatic component can have an antistatic effect against an adherend lacking an antistatic property (for example, a polarizer), and can reduce contamination of the adherend. Thus, the adhesive film can be very useful as an antistatic surface protective film in technical fields related to optical and electronic parts where static electricity and contamination can be particularly critical problems.

In addition, a blocking prevention agent (an antiblocking agent) may be added to the substrate film as described above. Alternatively, an antiblocking layer having an antiblocking agent may be provided on a surface of the substrate film, preferably on the surface of the substrate film on the other side from the primer layer.

Accordingly, the process for imparting an antiblocking property is not particularly limited, and a conventionally known process may be employed. Examples of such a process include a process in which a low friction resin containing a resin component and an antiblocking agent is applied to a surface of the substrate film, a process in which a low friction substance is deposited or plated, and a process in which a substrate film is formed using a material kneaded with an antiblocking agent. An example of the antiblocking agent specifically includes polybutylene terephthalate. When polybutylene terephthalate is used as an antiblocking agent in a substrate film, the resin component (for example, a polycarbonate resin) is preferably 90-70 mass % while polybutylene terephthalate is preferably 10-30 mass % relative to the total mass of the resin component and the antiblocking agent in the substrate film.

While polybutylene terephthalate as an antiblocking agent is preferably a homopolymer, it may be a copolymer. A copolymer of polybutylene terephthalate preferably has a modification ratio of 20 mol % or less, where a modification ratio refers to mol % of dicarboxylic acids other than terephthalic acid relative to the mole number of the whole dicarboxylic acid and mol % of diol components other than butanediol relative to the mole number of the whole diol in total.

Moreover, examples of the antiblocking agent specifically include crosslinked organic beads such as crosslinked styrene and crosslinked acrylic beads, and inorganic fillers such as spherical silica alumina. Furthermore, a fatty acid ester-based wax is preferably added to the antiblocking agent, where examples of such a fatty acid ester-based wax include compounds obtained by esterifying stearic acid, montanic acid or the like. The ratio of the solid antiblocking agent such as organic beads and inorganic fillers mentioned above to the fatty acid ester-based wax is preferably 5:1-1:2, for example, about 1:1 in mass ratio.

The content of the antiblocking agent in the substrate film is, for example, 0.05 mass % or more but less than or equal to 5.0 mass %, still more preferably 0.1 mass % or more but less than or equal to 3.0 mass %, particularly preferably 0.2 mass % or more but less than or equal to 1.0 mass %, relative to the total mass of the substrate film. Furthermore, in a case where an antiblocking layer is provided on the substrate film to form a laminate, an antiblocking agent is contained in the antiblocking layer preferably within the above-mentioned content range relative to the total mass of the antiblocking layer.

Addition of an antiblocking agent improves sliding property upon layering the adhesive film on other film, and also improves anti-stacking property of, for example, the molded body having the adhesive film adhered thereon.

A substrate film containing an antiblocking agent can be produced, for example, as follows. First, an antiblocking agent is added and mixed with a thermoplastic resin such as a polycarbonate resin, i.e., a material of the substrate film, to obtain a mixture of the material resin and the antiblocking agent. The resulting mixture is extruded into a sheet using an extrusion machine or the like while heating, thereby forming a substrate film.

Moreover, if an antiblocking layer is to be formed on a surface of the substrate film, the antiblocking layer can be produced in the same manner as the above-described substrate film. Specifically, an antiblocking agent is added and mixed with a thermoplastic resin that is used as a material of the antiblocking layer to obtain a mixture, which is then extruded to form an antiblocking layer. Thereafter, the antiblocking layer is laminated on a given substrate layer by a known process, thereby producing a substrate film having an antiblocking property in a form of a laminate.

The substrate film preferably contains 80 mass % or more, more preferably 90 mass % or more and particularly preferably 95 mass % or more thermoplastic resin. In addition, the thermoplastic resin of the substrate film preferably contains 80 mass % or more, more preferably 90 mass % or more and particularly preferably 95 mass % or more polycarbonate resin.

While the thickness of the substrate film is not particularly limited, it is, for example, 10 μm or more but less than or equal to 1000 μm (1 mm), preferably 30 μm or more but less than or equal to 700 μm, and more preferably 50 μm or more but less than or equal to 500 μm. For example, the thickness of the substrate film is 30 μm or more but less than or equal to 200 μm. As long as the thickness of the substrate film lies within this range, both of sticking processibility and sticking processibility on curved surfaces can be achieved easily. Moreover, a substrate film of the adhesive film may have two or more layers. When a substrate film has multiple layers, the total thickness of the substrate film is, for example, around 100 μm or more but less than or equal to 1000 μm, and preferably around 200 μm or more but less than or equal to about 500 μm.

Examples of the above-described substrate film having multiple layers, that is, a substrate film in a form of a multi-layered laminate, include: one obtained by layering an acrylic resin such as a polymethyl (meth)acrylate resin (PMMA: polymethyl acrylate and/or polymethyl methacrylate) on a layer of the above-described polycarbonate resin (PC) such as bisphenol A; and one obtained by layering a polycarbonate resin (PC) such as bisphenol C on a layer of a polycarbonate resin (PC) such as bisphenol A. In a laminate obtained by layering a layer of a polycarbonate resin (PC) containing bisphenol A and a layer of a polycarbonate resin (PC) containing bisphenol C, the polycarbonate resin containing bisphenol C is used, for example, as the outer surface.

Furthermore, a material that is used as the outer surface preferably has satisfactory hardness, in particular, harder than those of other materials used in the substrate film.

The polycarbonate resin used as the thermoplastic resin in the substrate film in a form of a laminate is preferably the same as those mentioned above for the polycarbonate resin used for forming a mono-layer substrate film. For example, a mixture or a copolymer of bisphenol A and bisphenol C may be used. A bisphenol C-based polycarbonate resin, for example, a polycarbonate resin composed solely of bisphenol C, or a polycarbonate resin composed of a mixture or a copolymer of bisphenol C and bisphenol A, can be used, in particular, to enhance hardness of the outer surface of the substrate film in a form of a laminate. In order to further enhance hardness, a polycarbonate resin, for example, a bisphenol C-based polycarbonate resin, can be used as a core layer while the above-described acrylic resin, for example, a polymethyl (meth)acrylate resin or the like, is used to form an outer surface (skin layer) which is thinner than the core layer, thereby obtaining a laminate having an outer surface layered on a core layer. Note that, from the viewpoints of heat resistance and optical performance of the substrate film, the substrate film is preferably formed solely from a polycarbonate resin without an acrylic resin layer, or a resin layer having a glass transition temperature and a refractive index comparable to those of the polycarbonate resin used as the core layer is preferably used.

The glass transition temperature of the substrate film is preferably 140° C. or higher but lower than 160° C., and more preferably 145° C. or higher but lower than 155° C.

Furthermore, the refractive index of the resin composing the substrate film is preferably 1.55-1.65, and more preferably 1.57-1.63.

[Primer Layer]

A solvent or the like contained in an adhesive agent is likely to cause problems like whitening, expansion or the like in the substrate film that is mainly composed of a polycarbonate resin, and therefore a primer layer is used to prevent occurrence of such problems. Specifically, a primer layer included in the adhesive film primary has a function of protecting the above-described substrate film.

<Urethane (Meth)Acrylate>

The primer layer preferably contains a urethane acrylate resin.

Herein, the terms urethane acrylate and acrylate also comprise urethane methacrylate and methacrylate, respectively, and are synonymous with urethane (meth)acrylate and (meth)acrylate, respectively.

(Urethane Acrylate Containing Molecular Structure with Cyclic Skeleton)

The urethane acrylate resin is preferably a urethane acrylate containing a molecular structure with cyclic skeleton. More specifically, an example of a favorable urethane acrylate specifically includes a polymer of an isocyanate compound and an acrylate compound having a cyclic backbone. The urethane acrylate resin which may have a molecular structure with cyclic skeleton is preferably UV curable.

Isocyanate Compounds

The isocyanate compound is, for example, an aromatic isocyanate which may have an alkyl group such as a methyl group as a substituent, preferably an aromatic isocyanate with a total carbon number of 6-16, still more preferably a C7-C14 aromatic isocyanate, and particularly preferably a C8-C12 aromatic isocyanate.

While the above-described isocyanate is preferably an aromatic isocyanate, an aliphatic, alicyclic or other isocyanate may be used as well.

Examples of a favorable structural unit of a urethane (meth)acrylate include: polyisocyanates such as tolylene diisocyanate, diphenylmethane diisocyanate, hydrogenated diphenylmethane diisocyanate, polyphenylmethane polyisocyanate, modified diphenylmethane diisocyanate, hydrogenated xylylene diisocyanate, xylylene diisocyanate, hexamethylene diisocyanate, trimethylhexamethylene diisocyanate, tetramethylxylylene diisocyanate, isophorone diisocyanate, norbornene diisocyanate, 1,3-bis(isocyanatomethyl)cyclohexane, phenylene diisocyanate, lysine diisocyanate, lysine triisocyanate and naphthalene diisocyanate; trimer compounds or tetramer compounds of such polyisocyanates; biuret polyisocyanates; water-dispersed polyisocyanates (for example, "AQUANATE 100", "AQUANATE 110", "AQUANATE 200", "AQUANATE 210", etc. available from Nippon Polyurethane Industry Co., Ltd.); and reaction products of such polyisocyanates and polyols.

Among these isocyanate compounds, examples of favorable isocyanate compounds specifically include diphenylmethane diisocyanate, toluene diisocyanate, naphthalene diisocyanate, a trimethylol propane (TMP) adduct of toluene diisocyanate, an isocyanate of toluene diisocyanate, a TMP adduct of xylene diisocyanate, as well as dicyclohexylmethane diisocyanate (H12MDI), isophorone diisocyanate (IPDI) and xylylene diisocyanate (XDI) represented by the following formulae.

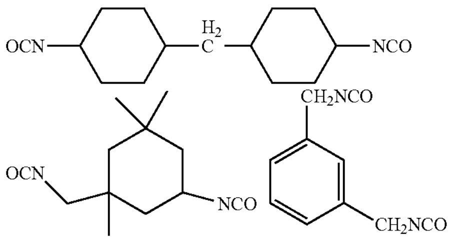

Acrylate Compounds

Examples of the acrylate compound include pentaerythritol triacrylate (PETA), pentaerythritol pentaacrylate (DPPA), and hydroxypropyl (meth)acrylate (hydroxypropyl acrylate: HPA).

In addition, a compound having a (meth)acryloyloxy group and a hydroxy group, for example, a monofunctional (meth)acrylic compound having a hydroxyl group can also be used as the acrylate compound.

Examples of a monofunctional (meth)acrylic compound having a hydroxyl group include a hydroxyl group-containing mono(meth)acrylate {for example, a hydroxyalkyl (meth)acrylate [for example, a hydroxy C2-C20 alkyl-(meth)acrylate such as 2-hydroxyethyl (meth)acrylate, 3-hydroxypropyl (meth)acrylate or 6-hydroxyhexyl (meth)acrylate, preferably a hydroxy C2-C12 alkyl-(meth)acrylate, and still more preferably a hydroxy C2-C6 alkyl-(meth)acrylate], a polyalkylene glycol mono(meth)acrylate [for example, a poly(C2-C4 alkylene glycol) mono(meth)acrylate such as diethylene glycol mono(meth)acrylate or polyethylene glycol mono(meth)acrylate], or a mono(meth)acrylate of a polyol having three or more hydroxyl groups [for example, an alkane polyol mono(meth)acrylate such as glycerol mono(meth)acrylate or trimethylol propane mono (meth)acrylate, or a mono(meth)acrylate of a polymer of an alkane polyol such as diglycerol mono(meth)acrylate]}, a N-hydroxyalkyl (meth)acrylamide (for example, a N-hydroxy C1-C4 alkyl (meth)acrylamide such as N-methylol (meth)acrylamide or N-(2-hydroxyethyl) (meth)acrylamide), and adducts obtained by addition of lactone (for example, a C4-C10 lactone such as s-caprolactone) to hydroxyl groups of these compounds (for example, hydroxyalkyl (meth)acrylate) (for example, an adduct obtained by addition of about 1-5 moles of lactone).

Note that one or more of these (meth)acrylic compounds can be used alone or in combination.

An example of a favorable compound for forming an alkyl group containing a (meth)acryloyloxy group specifically include 2-hydroxy-3-phenoxypropylacrylate.

Among the above-described acrylate compounds, particularly favorable examples specifically include pentaerythritol triacrylate (PETA), dipentaerythritol pentaacrylate (DPPA), and hydroxypropyl (meth)acrylate (hydroxypropyl acrylate: HPA).

Polymers of Isocyanate Compound and Acrylate Compound

Examples of the above-described polymer of an isocyanate compound and an acrylate compound, namely, a urethane acrylate polymer, that are favorable specifically include a polymer of xylylene diisocyanate (XDI) and pentaerythritol triacrylate (PETA), a polymer of XDI and pentaerythritol pentaacrylate (DPPA), a polymer of dicyclohexylmethane diisocyanate (H12MDI) and PETA, a polymer of isophorone diisocyanate (IPDI) and PETA, and a polymer of XDI and hydroxypropyl (meth)acrylate (HPA).

In addition the above-mentioned isocyanate compound and acrylate compound, examples of a urethane acrylate containing a cyclic backbone include a polymer containing a polyol compound as a structural unit.

A polyol compound (polyhydric alcohol) is a compound having two or more hydroxy groups in one molecule. Specifically, examples of such a polyol compound include: dihydric alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-4,5-pentanediol, 2,2,4-trimethyl-1,3-pentanediol, 1,6-hexanediol, 1,5-hexanediol, 1,4-hexanediol, 2,5-hexanediol, neopentyl glycol and neopentyl glycol hydroxypivalate; polylactone diols obtained by addition of a lactone such as ε-caprolactone to these dihydric alcohols; ester diols such as bis(hydroxyethyl)terephthalate; polyether diols such as an alkylene oxide adduct of bisphenol A, polyethylene glycol, polypropylene glycol and polybutylene glycol; monoepoxy compounds such as an α-olefin epoxide, e.g., propylene oxide or butylene oxide, and Cardura E10 [available from Shell Kagaku, product name, glycidyl ester of synthetic highly-branched saturated fatty acid]; trihydric or greater alcohols such as glycerol, trimethylol propane, trimethylol ethane, diglycerol, triglycerol, 1,2,6-hexanetriol, pentaerythritol, dipentaerythritol, sorbitol and mannitol; polylactonepolyols obtained by addition of a lactone such as s-caprolactone to these trihydric or greater alcohols; and alicyclic polyhydric alcohols such as 1,4-cyclohexane dimethanol, tricyclodecane dimethanol, hydrogenated bisphenol A, hydrogenated bisphenol F, hydrogenated bisphenol A and hydrogenated bisphenol F.

Examples of the polyol compound include a urethane acrylate containing tricyclodidecane dimethanol (TCDDM) represented by the following formula or the like as a structural unit.

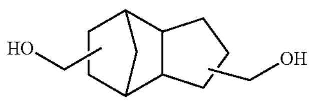

Examples of the aforementioned urethane acrylate polymer which are favorable specifically include a polymer of tricyclodidecane dimethanol (TCDDM), IPDI and PETA, a polymer of TCDDM, H12MDI and PETA, a polymer containing DPPA as a structural unit instead of or in addition to PETA in such polymers, and a polymer of xylylene diisocyanate (XDI) and hydroxypropyl (meth)acrylate (HPA).

(Urethane Acrylate Containing Prescribed Structural Unit)

An example of a favorable urethane acrylate resin specifically includes a urethane acrylate resin which has an isocyanate-derived structural unit and a structural unit derived from a compound having a (meth)acryloyloxy group and a hydroxy group as described below.

Examples of a favorable structural unit of the aforementioned urethane (meth)acrylate include the followings.

Isocyanate Compounds

The isocyanate compound forming the aforementioned structural unit is, for example, an aromatic isocyanate which may have an alkyl group such as a methyl group as a substituent, preferably an aromatic isocyanate with a total carbon number of 6-16, still more preferably a C7-C14 aromatic isocyanate, and particularly preferably a C8-C12 aromatic isocyanate.

The aforementioned isocyanate is preferably one that has a cyclic backbone. Thus, while favorable examples of the aforementioned isocyanate specifically include aromatic isocyanates and alicyclic isocyanates, an aliphatic isocyanate without a cyclic backbone (acyclic aliphatic isocyanate) may also be used.

Examples of a compound that forms a favorable structural unit of a urethane (meth)acrylate include: polyisocyanates such as tolylene diisocyanate, diphenylmethane diisocyanate, hydrogenated diphenylmethane diisocyanate, polyphenylmethane polyisocyanate, modified diphenylmethane diisocyanate, hydrogenated xylylene diisocyanate, xylylene diisocyanate, hexamethylene diisocyanate, trimethylhexamethylene diisocyanate, tetramethylxylylene diisocyanate, isophorone diisocyanate, norbornene diisocyanate, 1,3-bis(isocyanatomethyl)cyclohexane, phenylene diisocyanate, lysine diisocyanate, lysine triisocyanate and naphthalene diisocyanate; trimer compounds or tetramer compounds of such polyisocyanates; biuret polyisocyanates; water-dispersed polyisocyanates (for example, “AQUANATE 100”, “AQUANATE 110”, “AQUANATE 200”, “AQUANATE 210”, etc. available from Nippon Polyurethane Industry Co., Ltd.); and reaction products of such polyisocyanates and polyols.

Among these isocyanates, examples of a favorable isocyanate compound specifically include diphenylmethane diisocyanate, toluene diisocyanate, naphthalene diisocyanate, a trimethylol propane (TMP) adduct of toluene diisocyanate, an isocyanate of toluene diisocyanate, a TMP adduct of xylene diisocyanate.

Compounds Having (Meth)Acryloyloxy Group and Hydroxy Group

Examples of a favorable compound having a (meth)acryloyloxy group and a hydroxy group which is used for forming the aforementioned structural unit include monofunctional (meth)acrylic compounds having a hydroxyl group.

Examples of a monofunctional (meth)acrylic compound having a hydroxyl group include a hydroxyl group-containing mono(meth)acrylate {for example, hydroxyalkyl (meth)acrylate [for example, a hydroxy C2-C20 alkyl-(meth)acrylate such as 2-hydroxyethyl (meth)acrylate, 3-hydroxypropyl (meth)acrylate or 6-hydroxyhexyl (meth)acrylate, preferably a hydroxy C2-C12 alkyl-(meth)acrylate, and still more preferably a hydroxy C2-C6 alkyl-(meth)acrylate], a polyalkylene glycol mono(meth)acrylate [for example, a poly(C2-C4 alkylene glycol) mono(meth)acrylate such as diethylene glycol mono(meth)acrylate or polyethylene glycol mono(meth)acrylate], or a mono(meth)acrylate of a polyol having three or more hydroxyl groups [for example, an alkane polyol mono(meth)acrylate such as glycerol mono(meth)acrylate or trimethylol propane mono(meth)acrylate, or a mono(meth)acrylate of a polymer of an alkane polyol such as diglycerol mono(meth)acrylate]}, a N-hydroxyalkyl (meth)acrylamide (for example, a N-hydroxy C1-C4 alkyl (meth)acrylamide such as N-methylol (meth)acrylamide or N-(2-hydroxyethyl) (meth)acrylamide), and adducts obtained by addition of lactone (for example, a C4-C10 lactone such as ε-caprolactone) to hydroxyl groups of these compounds (for example, hydroxyalkyl (meth)acrylate) (for example, an adduct obtained by addition of about 1-5 moles of lactone).

Note that one or more of these (meth)acrylic compounds can be used alone or in combination.

An example of a favorable compound for forming an alkyl group (A3) containing a (meth)acryloyloxy group specifically includes 2-hydroxy-3-phenoxypropylacrylate.

In addition to an isocyanate compound and a compound having a (meth)acryloyloxy group and a hydroxy group, examples of the above-described urethane (meth)acrylate containing the prescribed structural units further includes a polymer containing a polyol compound as a structural unit.

A polyol compound (polyhydric alcohol) is a compound having two or more hydroxy groups in one molecule. Specifically, examples of such a polyol compound include: dihydric alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-4,5-pentanediol, 2,2,4-trimethyl-1,3-pentanediol, 1,6-hexanediol, 1,5-hexanediol, 1,4-hexanediol, 2,5-hexanediol, neopentyl glycol and neopentyl glycol hydroxypivalate; polylactone diols obtained by addition of a lactone such as ε-caprolactone to these dihydric alcohols; ester diols such as bis(hydroxyethyl)terephthalate; polyether diols such as an alkylene oxide adduct of bisphenol A, polyethylene glycol, polypropylene glycol and polybutylene glycol; monoepoxy compounds such as an α-olefin epoxide, e.g., propylene oxide or butylene oxide, and Cardura E10 [available from Shell Kagaku, product name, glycidyl ester of synthetic highly-branched saturated fatty acid]; trihydric or greater alcohols such as glycerol, trimethylol propane, trimethylolethane, diglycerol, triglycerol, 1,2,6-hexanetriol, pentaerythritol, dipentaerythritol, sorbitol and mannitol; polylactonepolyols obtained by addition of a lactone such as s-caprolactone to these trihydric or greater alcohols; and alicyclic polyhydric alcohols such as 1,4-cyclohexane dimethanol, tricyclodecane dimethanol, hydrogenated bisphenol A, hydrogenated bisphenol F, and hydrogenated bisphenol A and hydrogenated bisphenol F.

In addition to the isocyanate compound and the compound having a (meth)acryloyloxy group and a hydroxy group, the urethane (meth)acrylate containing a polyol compound as a structural unit preferably contains at least the component represented by Formula (I) below.

$$\text{(A3)-O(OC)HN-A2-HN(OC)—O-A1-O—(CO)NH-A2-NH—(CO)O-(A3)} \quad \text{(I)}$$

(In Formula (I), A1 represents an alkylene group derived from the aforementioned polyol compound, A2 each independently represent an alkylene group derived from the aforementioned isocyanate compound; and A3 each independently represent an alkyl group derived from the aforementioned a compound having a (meth)acryloyloxy group and a hydroxy group.)

An example of a favorable urethane (meth)acrylate contained in the aforementioned resin material specifically includes the following compound which contains structural units derived from ethylene glycol, pentaerythritol triacrylate and isophorone diisocyanate. In the following formula, n represents 0-10, preferably 1-5 and more preferably 1-3.

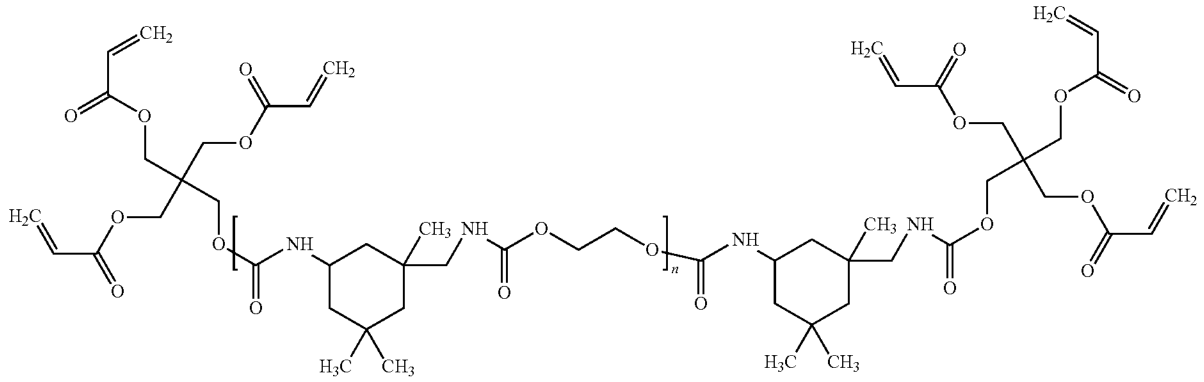

In a urethane acrylate resin, the ratio of a compound having a (meth)acryloyloxy group and a hydroxy group or a structural unit derived from such a compound, and an isocyanate or an isocyanate-derived structural unit is 99:1-30:70 (mass ratio), more preferably 97:3-60:40, and still more preferably 95:5-80:20.

(Urethane Acrylate Containing Acrylate)

Examples of a favorable urethane acrylate resin specifically include those containing a urethane acrylate and an acrylate. More favorable examples of such a urethane acrylate resin include those containing a mixture of a hexafunctional urethane acrylate and a bifunctional acrylate.

(Hexafunctional) Urethane Acrylates

As described above, the urethane acrylate resin preferably contains a urethane acrylate, in particular a hexafunctional urethane acrylate.

Examples of a favorable compound of a hexafunctional urethane acrylate include those represented by the following formula, namely, a polymer of dicyclohexylmethane diisocyanate (H12MDI) and pentaerythritol triacrylate (PETA), and a polymer of isophorone diisocyanate (IPDI) and PETA. Examples of favorable products of these hexafunctional urethane acrylates specifically include UN-3320HC (polymer of H12MDI and PETA: available from Negami Chemical Industrial Co., Ltd.), CN-968 (polymer of IPDI and PETA: available from Sartomer Japan Inc.), and CN-975 (available from Sartomer Japan Inc.).

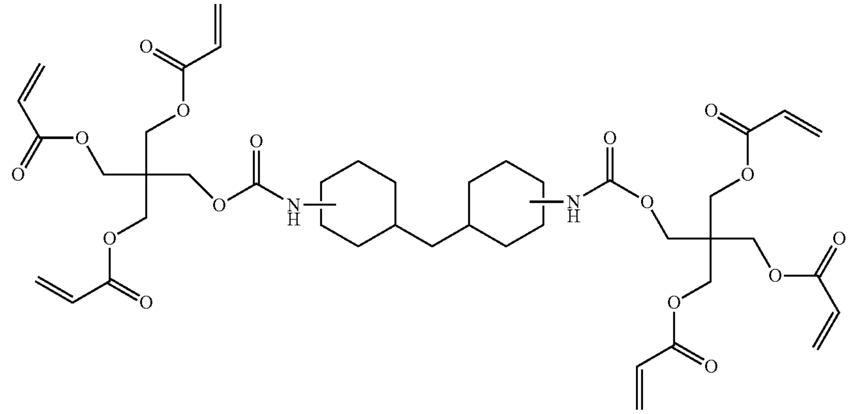

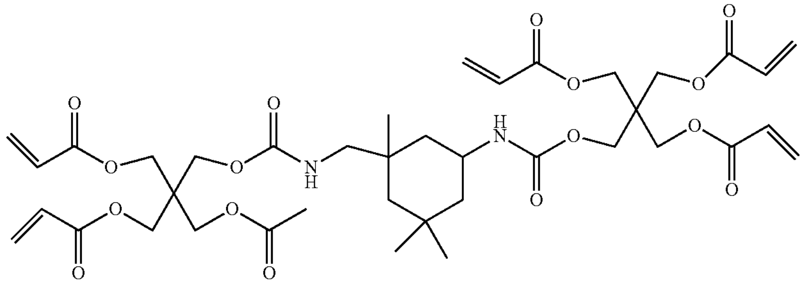

(Meth)Acrylates (Bifunctional (Meth)Acrylate, Etc.)

As described above, a (meth)acrylate that is preferably contained in the urethane acrylate resin is preferably a C4-C20 compound that contains at least one (meth)acryloyloxy group and at least one vinyl ether group, and that may have a substituent. The number of carbons in the (meth) acrylate is preferably 6-18, and more preferably 8-16. An example of the substituent of the (meth)acrylate includes an alkyl group.

Furthermore, the (meth)acrylate is preferably bifunctional.

As the (meth)acrylate, for example, 2-(2-vinyloxyethoxy) ethyl (meth)acrylate [2-(2-vinyloxyethoxy)ethyl acrylate: VEEA] represented by the following formula can be used favorably.

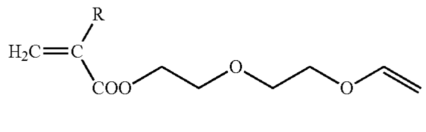

(In the formula above, R is hydrogen or a methyl group.)

A primer coating material as a material for forming a primer layer preferably contains 80 wt % or more resin material, more preferably 90 wt % or more resin material, and still more preferably 95 wt % or more resin material relative to the total weight of the primer coating material. Furthermore, the resin material preferably contains 80 wt % or more urethane (meth)acrylate.

In said urethane acrylate resin, the ratio of a urethane acrylate and a (meth)acrylate is preferably 99:1-30:70 (weight ratio), more preferably 97:3-60:40, and still more preferably 95:5-80:20.

As described above, when a urethane acrylate resin containing a mixture of a urethane acrylate and an acrylate, preferably a mixture of a hexafunctional urethane acrylate and a bifunctional acrylate, is used to form a primer layer, bonding property to the substrate film and bendability of the primer layer are improved.

<Other Components>

The material used for forming a primer layer, namely, a primer coating material, may be added with a resin material other than the urethane (meth)acrylate and the acrylate. For example, an antistatic agent, a UV absorber (UV shielding agent), a near-infrared shielding agent, a light diffusion agent such as silica or metal particles or the like may be added as components other than epoxy (meth)acrylate, acrylic acrylate and a resin material.

As an antistatic agent contained in the primer layer, a hydrophilic group-containing unsaturated resin or the like is used.

A hydrophilic group-containing unsaturated resin as an antistatic agent preferably comprises an acid group, a salt-forming group thereof [carboxyl (carboxylate) group, sulfonic acid (sulfonate) group, sulfuric acid (sulfate) group, phosphoric acid (phosphate) group, etc.], a hydroxy group, an amide group, an amino group, a quaternary ammonium salt group, an acid anhydride group, an ether group or the like as the hydrophilic group.

The resin preferably contains an average of one or more hydrophilic groups in one resin molecule. Moreover, a radically polymerizable unsaturated group contained in the resin specifically comprises a vinyl group, an acryloyl group, a methacryloyl group, a styryl group, an isopropenyl group or the like. The resin preferably contains an average of one or more unsaturated groups in one resin molecule. A hydrophilic group-containing unsaturated resin may be a resin containing a divalent organic group on the same molecular chain between the aforementioned unsaturated group and hydrophilic group. The divalent organic group may also serve as a hydrophilic group like an ether bond. Examples of the divalent organic group include: the above-described hydrocarbon group having one or more groups selected from the group consisting of a divalent hydrocarbon group [an alkylene group (a methylene group, an ethylene group, a butylene group, an isopropylene group, etc.), a part of an aromatic ring structure (a phenylene group, a biphenylene group, a naphtylene group, etc.), a part of a non-aromatic ring structure (a cyclohexylene group, etc.), an unsaturated aliphatic hydrocarbon group (a vinylene group, etc.) and a substituted version of these hydrocarbon groups]; and a divalent organic group containing nitrogen and/or oxygen atom [a carbonyl group, an ester group, an imino group, an amide group, a urethane group, a urea group or a (nitrogen and/or oxygen atom-containing) heterocyclic residue (a pyrrolylene group, a pyridylene group, a piperidylene group, a furylene group, etc.)]. The aforementioned hydrophilic group-containing unsaturated monomer may be an anionic, nonionic or cationic unsaturated monomer.

(1) Hydrophilic Group-Containing Unsaturated Monomers that is Anionic or that Becomes Anionic Examples of hydrophilic group-containing unsaturated monomers that is anionic or that becomes anionic include the following compounds.

(i) Unsaturated Monomers Having Carboxylic Acid Group

Examples of an unsaturated monomer having a carboxylic acid group include a carboxyl group-containing unsaturated vinylic monomer such as: an unsaturated monocarboxylic acid, for example, a (meth)acrylic acid, crotonic acid, cinnamic acid or the like; an unsaturated dicarboxylic acid, for example, maleic acid, fumaric acid, citraconic acid, itaconic acid or the like; or a monoalkyl (C1-C8) ester of an unsaturated dicarboxylic acid (mentioned above), for example, monobutyl maleate, monobutyl fumarate, an ethyl carbitol monoester of maleic acid, an ethyl carbitol monoester of fumaric acid, a monobutyl ester of citraconic acid, a glycol monoester of itaconic acid or the like, and combinations of two or more of them.

(ii) Radically Polymerizable Unsaturated Monomers Having Sulfonic Acid Group

Examples of a radically polymerizable unsaturated monomer having a sulfonic acid group include a C2-C30 aliphatic or aromatic vinyl sulfonic acid, for example, vinylsulfonic acid, (meth)allylsulfonic acid; styrenesulfonic acid or α-methylstyrene sulfonic acid; a (meth)acrylalkyl sulfonic acid [(meth)acryloxypropyl sulfonic acid, 2-hydroxy-3-(meth)acryloxypropyl sulfonic acid, 2-(meth)acryloyl amino-2,2-dimethylethane sulfonic acid, 3-(meth)acryloxyethane sulfonic acid, 2-(meth)acrylamide-2-methylpropane sulfonic acid, 3-(meth)acrylamide-2-hydroxypropane sulfonic acid]; and an alkyl (C3-C18) (meth)allyl sulfosuccinate.

(iii) Radically Polymerizable Unsaturated Monomers Having Sulfate Ester

Examples of a radically polymerizable unsaturated monomer having a sulfate ester include a sulfate ester of a hydroxyalkyl (C2-C6) (meth)acrylate [a sulfate ester of hydroxyethyl (meth)acrylate, etc.]; and a sulfate ester of a poly(n=2-30)-oxyalkylene (C2-C4: homo-, random or block) mono(meth)acrylate [a sulfate ester of a poly(n=5-15)-oxypropylene monomethacrylate, etc.].

(iv) Radically Polymerizable Unsaturated Monomers Having Phosphate Group

Examples of a radically polymerizable unsaturated monomer having a phosphate group include monophosphate of a hydroxyalkyl (C2-C6) (meth)acrylate [for example, a monophosphate of a hydroxyethyl (meth)acylate, etc.], a phosphate diester of a hydroxyalkyl (C2-C6) (meth)acrylate [for example, phenyl-2-acryloyloxyethyl phosphate, etc.], and an alkyl (C2-C6) (meth)acrylate phosphonic acids [for example, 2-acryloyloxyethyl phosphonic acid, etc.].

(v) Salts of (i)-(iv) Above

Examples of a hydrophilic group-containing unsaturated monomer that is anionic or that becomes anionic also include salts of (i)-(iv) above. Examples of such salts include an alkali metal salt (a sodium salt, a potassium salt, etc.), an alkaline earth metal salt (a calcium salt, a magnesium salt, etc.), an ammonium salt [ammonium, tetraalkyl (C1-C8) ammonium, for example, tetraoctylammonium, etc.] or an organic amine salt {C2-C8 alkanolamine, polyalkylene (C1-C8) polyamine (2-10 amino groups) or a derivative thereof [a C1-C8 alkylated product, a C2-C12 alkylene oxide adduct (1-30), etc.], a C1-C4 lower alkyl amine, etc.}.

(2) Hydrophilic Group-Containing Nonionic Unsaturated Monomer

Examples of a hydrophilic group-containing nonionic unsaturated monomer include the following compounds.

(i) Radically Polymerized Unsaturated Monomers Having Hydroxy Group

Examples of a radically polymerizable unsaturated monomer having a hydroxy group include a monoethylenically unsaturated alcohol [for example, a (meth)allyl alcohol, etc.]; and a monoethylenically unsaturated ester or ether of a di- to hexa-valent or greater polyol (for example, C2-C20 alkylene glycol, glycerol, a polyalkylene (C2-C4) glycol (molecular weight 106-2000), etc.) [for example, hydroxyethyl (meth)acrylate, hydroxypropyl (meth)acrylate, triethylene glycol (meth)acrylate, poly-oxyethylene-oxypropylene (random or block) glycol mono(meth)allyl ether (where the terminal hydroxy group may be etherified or esterified), etc.].

(ii) Radically Polymerized Unsaturated Monomers Having Amide Group

Examples of a radically polymerized unsaturated monomer having an amide group include (meth)acrylamide, a N-alkyl (C1-C8) (meth)acrylamide [for example, N-methylacrylamide, etc.], a N,N-dialkyl (C1-C8) acrylamide [for example, N,N-dimethylacrylamide, N,N-di-n- or i-propylacrylamide, etc.], a N-hydroxyalkyl (C1-C8) (meth)acrylamide [for example, N-methylol (meth)acrylamide, N-hydroxyethyl (meth)acrylamide, etc.]; a N,N-dihydroxyalkyl (C1-C8) (meth)acrylamide [for example, N,N-dihydroxyethyl (meth)acrylamide, etc.], and a vinyl lactam [for example, N-vinylpyrrolidone, etc.].

(3) Hydrophilic Group-Containing Unsaturated Monomers that are Cationic or that Become Cationic Examples of a hydrophilic group-containing unsaturated monomer that is cationic or that becomes cationic include the following compounds.

(i) Radically Polymerizable Monomers Having Amino Group

Examples of a radically polymerizable monomer having an amino group include an amino group-containing ester of a monoethylenically unsaturated monomer or a dicarboxylic acid, for example a dialkyl (C1-C8) aminoalkyl (C2-C10) (meth)acrylate, a dihydroxyalkyl (C1-C8) aminoalkyl (C2-C10) ester, a morpholinoalkyl (C1-C8) ester or the like [for example, dimethyl aminoethyl (meth)acrylate, diethyl amino (meth)acrylate, morpholinoethyl (meth)acrylate, dimethyl aminoethyl fumarate, etc.]; an amino group-containing amide of a monoethylenically unsaturated monomer or a dicarboxylic acid, for example, a monoalkyl (C2-C10) (meth)acrylamide or the like [for example, dimethyl aminoethyl (meth)acrylamide, diethyl aminoethyl (meth)acrylamide, etc.]; a heterocyclic vinyl monomer [for example, a vinylpyridine such as 2-vinylpyridine, 4-vinylpyridine and N-vinylpyridine, N-vinylimidazole, etc.]; and diallylamine.

(ii) Radically Polymerizable Unsaturated Compounds Having Quaternary Ammonium Group Examples of a radically polymerizable unsaturated compound having a quaternary ammonium group include a quaternized product of a tertiary amino group-containing radically polymerizable unsaturated compound (those obtained by quarternizing the aforementioned tertiary amino group-containing radically polymerizable unsaturated compound with a quarternizing agent, for example, a C1-C8 alkylating agent such as methyl chloride, dimethyl sulfate, benzyl chloride, dimethyl carbonate or the like), for example, trimethyl aminoethyl (meth)acrylate chloride, methyldiethyl aminoethyl (meth)acrylate methosulfate, trimethyl aminoethyl (meth)acrylamide chloride, diethylbenzyl aminoethyl (meth)acrylamide chloride or the like.

Alternatively, an ionic liquid, a conductive polymer such as a polythiophene-based conductive polymer, an inorganic-based material such as antimony-doped tin oxide, antimony-doped zinc oxide, gallium-doped zinc oxide, tin-doped indium oxide or the like may also be used.

A UV absorber (UV shielding agent) that may be contained in the primer layer may be an organic compound, an inorganic compound or the like.

Examples of an organic UV shielding agent include a benzotriazole-based, a benzophenone-based, a phenyl salicylate-based and a triazine-based UV absorbers.

Examples of the benzotriazole-based UV absorber include 2-(5-methyl-2-hydroxyphenyl)benzotriazole, 2-[2-hydroxy-3,5-bis(α,α-dimethylbenzyl)phenyl]-2H-benzotriazole, 2-(2'-hydroxy-5'-t-octyl phenyl)benzotriazole, and 2,2-methylenebis[4-(1,1,3,3-tetramethylenebutyl)-6-(2H-benzotriazole-2-yl)phenol].

Examples of the benzophenone-based UV absorber include 2-hydroxy-4-octoxybenzophenone, 2,4-dihydroxybenzophenone, 2-hydroxy-4-methoxy-4'-chlorobenzophenone, 2,2-dihydroxy-4-methoxybenzophenone, and 2,2-dihydroxy-4,4'-dimethoxybenzophenone.

Examples of the phenyl salicylate-based UV absorber include p-t-butyl phenyl salicylate.

Furthermore, examples of the triazine-based UV absorber include: 2,4-diphenyl-6-(2-hydroxy-4-methoxyphenyl)-1,3,5-triazine; 2,4-diphenyl-6-(2-hydroxy-4-ethoxyphenyl)-1,3,5-triazine; 2,4-diphenyl-(2-hydroxy-4-propoxyphenyl)-1,3,5-triazine; 2,4-diphenyl-(2-hydroxy-4-butoxyphenyl)-1,3,5-triazine; 2,4-diphenyl-6-(2-hydroxy-4-butoxyphenyl)-1,3,5-triazine; 2,4-diphenyl-6-(2-hydroxy-4-hexyloxyphenyl)-1,3,5-triazine; 2,4-diphenyl-6-(2-hydroxy-4-octyloxyphenyl)-1,3,5-triazine; 2,4-diphenyl-6-(2-hydroxy-4-dodecyloxyphenyl)-1,3,5-triazine; 2,4-diphenyl-6-(2-hydroxy-4-benzyloxyphenyl)-1,3,5-triazine; and 2,4-diphenyl-6-(2-hydroxy-4-butoxyethoxy)-1,3,5-triazine.

However, the organic UV shielding agents are not limited to those mentioned above, and a generally available UV absorber or the like can be used.

Examples of a typical inorganic UV shielding agent include zinc oxide, titanium oxide, cerium oxide and iron oxide.

A near-infrared shielding agent that may be contained in the primer layer may be an organic compound, an inorganic compound or the like.

An organic near-infrared shielding agent may suitably be one selected from the group of materials consisting of phthalocyanine, naphthalocyanine, metal complexes, azo dyes, anthraquinone, quadratic acid derivatives, immonium dyes, perylene, quaterrylene and polymethine. Among others, phthalocyanine and naphthalocyanine are particularly suitable.

Examples of the inorganic near-infrared shielding agent include antimony-doped tin oxide, antimony-doped zinc oxide, gallium-doped zinc oxide and tin-doped indium oxide.

A light diffusion agent that may be contained in the primer layer may be an organic compound, an inorganic compound or the like, in particular, fine particles of an organic or inorganic compound. The component of the particles used as a light diffusion agent, namely, light diffusing particles is not particularly limited as long as it can impart light diffusing property.

Examples of the organic fine particles include fine particles of a styrene-based resin, an acrylic resin, an ethylene-based resin or the like, benzoguanamine-based resin particles, silicone fine particles, melamine resin particles, polytetrafluoroethylene (PTFE) particles, and resin beads (fine particles) of a cured resin of an amino-based compound and formaldehyde or the like.

Examples of the inorganic fine particles include silica (silicon dioxide) such as crystalline silica and amorphous silica; glass flakes, glass fibers and glass beads; fine particles of a metal oxide such as aluminum oxide, zirconia, titania, zinc oxide, germanium oxide, indium oxide, tin oxide, indium tin oxide, antimony oxide or cerium oxide; fine particles of a metal fluoride such as magnesium fluoride or sodium fluoride; fine particles of a metal sulfide such as barium sulfide; fine particles of a metal carbonate such as calcium carbonate; fine particles of a metal nitride; and metal fine particles. One or more kinds of them may be used alone or in combination.

Although there is some overlap with the aforementioned examples, examples of the metal fine particles include particles of titanium oxide, zirconium oxide ($ZrO_2$), zinc oxide, alumina, colloidal alumina, lead titanate, red lead, yellow lead, zinc yellow, chromium oxide, ferric oxide, iron black, copper oxide, magnesium oxide, magnesium hydroxide, strontium titanate, yttrium oxide, hafnium oxide, niobium oxide, tantalum oxide ($Ta_2O_5$), barium oxide, indium oxide, europium oxide, lanthanum oxide, zircon, tin oxide and lead oxide, and multiple oxides thereof such as lithium niobate, potassium niobate, lithium tantalate and aluminum-magnesium oxide ($MgAl_2O_4$).

The component of the metal fine particles may be a rare-earth oxide, for example, scandium oxide, yttrium oxide, lanthanum oxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide, lutetium oxide or the like.

For the purpose of improving dispersibility of the fine particles in the coating material or improving surface hardness of the resulting hard coat, the surface of the aforementioned fine particles may be treated with: a silane-based coupling agent such as vinylsilane or aminosilane; a titanate-based coupling agent; an aluminate-based coupling agent; an organic compound having an ethylenically unsaturated binding group such as a (meth)acryloyl group, a vinyl group or an allyl group, or a reactive functional group such as an epoxy group; or a surface treating agent such as a fatty acid or a fatty acid metal salt.

In addition, any of a leveling agent, a photoinitiator (photopolymerization initiator) and the like may be contained as a material of the primer layer. Moreover, the resin material may contain a solvent.

A leveling agent is added to the primer coating material to orient itself on the surface of the coated film during the process of drying and even outs and reduces the surface tension of the coated film, thereby preventing floating and cissing and enhancing wettability on the coated subject. A favorable leveling agent may be, for example, a silicon-based surfactant, an acrylic surfactant, a fluorine-based surfactant or the like.

The primer coating material preferably contains 80 wt % or more resin material, more preferably 90 wt % or more resin material and still more preferably 95 wt % or more resin material, relative to the total weight of the primer coating material. Furthermore, the resin material preferably contains 80 wt % or more urethane (meth)acrylate.

While the thickness of the primer layer is not particularly limited, it is, for example, 2-10 μm, and preferably 3-8 μm. As long as the thickness of the primer layer lies within this range, the solvent is prevented from penetrating into the substrate film upon applying the adhesive agent coating material and generation of cracks can be suppressed.

While the primer layer is preferably provided between the substrate film and the adhesive layer, other layer that will be described later in detail may also be provided between the primer layer and the substrate film or between the primer layer and the adhesive layer.

[Adhesive Layer]

At least one of the adhesive layer included in the adhesive film is laminated on the surface of the primer layer on the other side from the substrate film.

The adhesive layer preferably contains at least one of a silicone adhesive agent, an acrylic adhesive agent and a urethane adhesive agent. Such an adhesive agent is used to realize high adhesiveness and suitable bonding property to the primer layer.

Moreover, since the adhesive layer bonds tightly to the primer layer, it is preferably detachable. A detachable adhesive layer once removed from the primer layer can adhere to the primer layer again.

A silicone adhesive agent is an adhesive agent containing a silicon-based polymer, where specific examples thereof include a polymer made from KR-3700 (base agent) and CAT-PL-50T (platinum catalyst) available from Shin-Etsu Chemical Co., Ltd.

An acrylic adhesive agent is an adhesive agent containing an acrylic polymer, where specific examples include Quickmaster (CT-3088, CT-3850, CT-6030, CT-5020, CT-5030) and Quickmaster (SPS-900-IV, Quickmaster SPS-1040NT-25) available from DIC Corporation, and Oribain adhesive agents available from TOYOCHEM Co., Ltd.

A urethane adhesive agent is an adhesive agent containing a urethane-based polymer, where specific examples include Oribain adhesive agents available from TOYOCHEM Co., Ltd.

While the thickness of the adhesive layer is not particularly limited, it is, for example, 5 μm or more but less than or equal to 500 μm, preferably 10 μm or more but less than or equal to 200 μm, more preferably 10 μm or more but less than or equal to 100 and particularly preferably 20 μm or more but less than or equal to 100 μm. As long as the thickness of the adhesive layer lies within this range, both appearance and sticking processibility can be achieved easily.

While the adhesive layer preferably forms the outermost layer of the adhesive film laminate, other layer that will be described in detail below may be arranged on the outer side of the adhesive layer.

The adhesive layer preferably tightly bonds to a surface of other member, for example, a molded resin body compositing a laminate described below. Specifically, the adhesive layer preferably has a moderate peel adhesion where it practically does not come off when attached to a surface of other member such as a molded resin body but can be removed therefrom without difficulty as required. The peel adhesion as determined, for example, by the evaluation method according to JIS Z0237 described in detail below is preferably sufficiently high and lies within the prescribed range.

Specifically, the peel adhesion is preferably 0.001 (N/25 mm) or more but equal to or less than 3 (N/25 mm) in a peel test where, for example, a polycarbonate resin-made mirror-finished film with a thickness of 0.05 (mm) is used instead of the prescribed test plate employed in the JIS Z0237 standard and an adhesive layer is laminated on a surface of the mirror-finished film and peeled in the 180° direction at 152 mm/min in an environment of 23° C. and relative humidity of 50%. The thus-determined peel adhesion of the adhesive layer is more preferably 0.005 (N/25 mm) or more, still more preferably 0.01 (N/25 mm) or more, and particularly preferably 0.02 (N/25 mm) or more. As long as the peel adhesion lies within this range, defects caused by delamination can be practically suppressed. The peel adhesion is, for example, 4.0 (N/25 mm) or less or 3.0 (N/25 mm) or less, preferably 2.0 (N/25 mm) or less, more preferably 1.0 (N/25 mm) or less, still more preferably 0.6 (N/25 mm) or less, and particularly preferably 0.4 (N/25 mm) or less. As long as the peel adhesion lies within this range, the adhesive layer is highly detachable and thus favorable for usage as a protective film.

[Additional Layers (Layers Other than Substrate Film, Primer Layer and Adhesive Layer)]

The adhesive film may be laminated with a layer (additional layer) other than the substrate film, the primer layer and the adhesive layer. For example, other layer may be provided between the substrate film and the primer layer, between the primer layer and the adhesive layer, or on the outer surface of the substrate film or the adhesive layer of the adhesive film.

The adhesive film may be further provided with the aforementioned other layer (additional layer) which serves as a hard coat layer. The hard coat layer can be provided to improve surface hardness of the adhesive film. While the thickness of the hard coat layer is not particularly limited, it is preferably 1-10 μm, more preferably 2-8 μm, and still more preferably about 3-7 μm.

The hard coat layer is formed, for example, on a surface of the substrate film or else, preferably the surface of the substrate film that does not have the primer layer laminated thereon.

The hard coat layer is preferably formed by subjecting the surface of the substrate film or else to a hard coat treatment. Specifically, a thermosetting or active energy ray-curable hard coat material is preferably applied and cured to provide a hard coat layer.

Examples of the active energy ray-curable coating material include a resin composition composed of one or more monofunctional or polyfunctional acrylate monomers or oligomers or the like, more preferably a resin composition containing a urethane acrylate oligomer. A photopolymerization initiator is preferably added as a curing catalyst to such a resin composition.

Examples of the thermosetting resin coating material include polyorganosiloxane-based and crosslinked acrylic resin compositions. Such resin compositions are commercially available as hard coat agents for acrylic or polycarbonate resins, and may suitably be selected by considering suitability with the coating line.

Examples of the active energy ray-curable hard coat coating material include one obtained by adding 1-10 parts by weight of a photopolymerization initiator to 100 parts by weight of a photopolymerizable resin composition obtained by mixing 40-95 wt % hexafunctional urethane acrylate oligomer and 5-60 wt % (meth)acrylate such as 2-(2-vinyloxyethoxy)ethyl (meth)acrylate [2-(2-vinyloxyethoxy) ethyl acrylate: VEEA].

The aforementioned photopolymerization initiator may be a generally known photopolymerization initiator. Examples of such a photopolymerization initiator specifically include benzoin, benzophenone, benzoin ethyl ether, benzoin isopropyl ether, 2,2-dimethoxy-2-phenylacetophenone, 1-hydroxycyclohexyl phenyl ketone, 2-hydroxy-2-methyl-1-phenylpropane-1-one, azobis(isobutyronitrile) and benzoyl peroxide.

The aforementioned component other than the resin material in the primer layer may also be added to the hard coat layer.

[Method for Fabricating Adhesive Film]

In order to fabricate an adhesive film, a substrate film is preferably formed first. The substrate film is produced by processing a material such as a resin composition like a PC resin into a layer (sheet) by a conventional process, for example, a process such as extrusion or casting. Examples of extrusion include a method in which pellets, flakes or powder of the resin composition of the present invention is melted and kneaded in an extruder and then extruded from a T-die or the like, and the resulting semi-molten sheet is cooled to solidify while being pressed with rolls, thereby forming a sheet.

Using this substrate film containing a polycarbonate, an adhesive film can be produced by a fabrication process comprising a primer layer forming step and an adhesive layer forming step described below.

In the primer layer forming step, a primer coating material (primer solution) is applied and cured on a surface of the substrate film to form a primer layer.

In the adhesive layer forming step, an adhesive agent is applied and cured on the surface of the resulting primer layer on the other side from the substrate film to form an adhesive layer.

As the process for curing the primer coating material or the adhesive agent, a process such as photocuring or thermosetting may be employed.

[Properties of Adhesive Film]

<Condition of Film Surface>

The surface of the adhesive film, in particular, the surface of the adhesive layer usually forming the outermost layer, as well as the surface of the substrate film containing a PC resin are preferably in a good condition. The primer layer is preferably provided so that crack, whitening, blister and unevenness (mainly uneven coloring) are not found on the surface of the substrate film after the steps of drying and curing for forming the adhesive layer and the surface of the resulting adhesive film has favorable appearance.

Specifically, appearance of the surface of the adhesive film can be evaluated, for example, by observing the appearance when a silicone adhesive agent coating material is applied to the surface of the primer layer laminated on the substrate film.

<Wettability of Primer Layer>

The surface of the primer layer on the adhesive layer side preferably has high wettability. A primer layer having high wettability is used to enhance bonding property to the adhesive layer. Specifically, the surface of the primer layer on the adhesive layer side preferably has a wetting index of 30 (mN/m (=dyn/cm)) or more in accordance with JISK6768, where said wetting index is more preferably 32 (mN/m) or more, still more preferably 34 (mN/m) or more, and particularly preferably 35 (mN/m) or more.

<Bonding Property>

The substrate film and the adhesive layer preferably bond tightly to each other.

[Laminated Body]

A laminate of the present invention comprises the aforementioned adhesive film and a molded resin body having the adhesive film attached thereto. The molded resin body is, for example, a window, a display, a lens, a box, a carved panel or a film. Favorable examples of the molded resin body as a film specifically include a polycarbonate film and a polyimide

EXAMPLES

Hereinafter, the present invention will be described more specifically by way of examples. The present invention, however, should not be limited to the following examples, and can be modified and carried out in any way without departing from the scope of the present invention.

<Synthesis of Urethane Acrylate>

2391 parts by weight of pentaerythritol triacrylate (PETA), 1.4 parts by weight of dibutyltin dilaurate, and 2.8 parts by weight of 2,6-tert-butyl-4-methylphenol (BHT) were placed into a 3 L three-necked flask and homogeneously mixed. Subsequently, 409 parts by weight of xylene diisocyanate was fed therein while keeping the temperature at 60° C., and then the resultant was stirred at 70° C. for 15 hours to complete the reaction.

The resulting urethane acrylate was used as urethane acrylate solution A.

2624 parts by weight of dipentaerythritol pentaacrylate (DPPA), 1.4 parts by weight of dibutyltin dilaurate and 2.8 parts by weight of 2,6-tert-butyl-4-methylphenol (BHT) were placed into a 3 L three-necked flask and homogeneously mixed. Subsequently, 176 parts by weight of xylylene diisocyanate was fed therein while keeping the temperature at 60° C., and then the resultant was stirred at 70° C. for 15 hours to complete the reaction.

The resulting urethane acrylate was used as urethane acrylate solution B.

<Preparation of Primer Coating Material>

90 parts by weight of a hexafunctional urethane acrylate (available from Negami Chemical Industrial Co., Ltd., product name UN-3320HC), 10 parts by weight of a bifunctional acrylate (available from Nippon Shokubai Co., Ltd. product name VEEA) and 5 parts by weight of photoinitiator I-184 (available from BASF) were formulated to give a solid content of 30 wt % with a solvent propylene glycol monomethyl ether to obtain primer coating material 1.

20 parts by weight of the above-described urethane acrylate solution A, 80 parts by weight of the above-described urethane acrylate solution B and 5 parts by weight of photoinitiator I-184 (available from BASF) were formulated to give a solid content was 30 wt % with a solvent propylene glycol monomethyl ether to obtain primer coating material 2.

20 parts by weight of urethane acrylate solution A, 80 parts by weight of urethane acrylate solution B and 5 parts by weight of photoinitiator I-184 (available from BASF) were formulated to give a solid content was 30 wt % with a solvent propylene glycol monomethyl ether to prepare a primer solution. To this primer solution, 1 parts by weight of byk-347 (available from BYK), a leveling agent having a silicon-based surfactant as the main component, was added and stirred to obtain primer coating material 3.

90 parts by weight of a hexafunctional urethane acrylate composed of hexamethylene diisocyanate and pentaerythritol triacrylate (available from DKS Co., Ltd.), 10 parts by weight of a bifunctional acrylate (available from Nippon Shokubai Co., Ltd. product name VEEA), and 5 parts by weight of photoinitiator I-184 (available from BASF) were formulated to give a solid content was 30 wt % with a solvent propylene glycol monomethyl ether to obtain primer coating material 4.

<Preparation of Silicone Adhesive Agent (Adhesive Coating Material 1)>

To 100 parts by weight of a base agent (available from Shin-Etsu Chemical Co., Ltd. product name KR-3700), 0.5 parts by weight of a platinum catalyst for curing (available from Shin-Etsu Chemical Co., Ltd. product name CAT-PL-50T) was added, mixed thoroughly and diluted with toluene as a solvent, such that the solid content was 40 wt % to obtain a silicone adhesive agent coating material (adhesive coating material 1).

Example 1

Primer coating material 1 described above was applied onto one side of a 100 μm-thick polycarbonate film having 2,2-bis(4-hydroxyphenyl)propane (bisphenol A) as the main component (available from Mitsubishi Gas Chemical Company, Inc., FE-2000) such that the thickness of the coated film becomes 3 μm when dried, and dried at 100° C. for 2 minutes with a hot air circulation dryer. The resultant was further exposed to ultraviolet light for integrated irradiance of 200 $mJ/cm^2$ using an UV-curing equipment, thereby obtaining a primer-treated film which had the primer layer formed on the surface of the polycarbonate film.

Then, the aforementioned silicone adhesive agent, i.e., adhesive coating material 1, was applied onto the surface of the primer-treated film on the primer layer side such that the thickness of the coated film was 50 μM when dried, and the resultant was dried with a hot air circulation dryer at 120° C. for 1 minute.

Thus, an adhesive film of Example 1 was obtained.

Examples 2-4

Adhesive films of Examples 2-4 were obtained in by the same fabrication process as Example 1 except that primer coating materials 2-4 were used instead of primer coating material 1, respectively.

Comparative Example 1

The aforementioned silicone adhesive agent, i.e., adhesive coating material 1, was applied onto one side of a 100 μm-thick polycarbonate film having 2,2-bis(4-hydroxyphenyl)propane (bisphenol A) as the main component (available from Mitsubishi Gas Chemical Company, Inc. FE-2000) such that the thickness of the coated film becomes 50 μm when dried, and dried at 120° C. for 1 minute with a hot air circulation dryer.

Thus, an adhesive film of Comparative example 1 was obtained.

Evaluation items and results thereof are shown below for each of the fabricated adhesive films of the examples and the comparative example.

[Evaluation Method]

1) Appearance:

The appearance after applying the silicone adhesive agent coating material on the surface of the primer-treated film (the film obtained by forming a primer layer on a surface of a substrate film, or the polycarbonate film in the comparative example) was observed to examine the presence of whitening. For those without whitening, presence of cissing that causes holes or dents in the surface was also examined.

2) Bonding Property:

The adhesive side of the substrate film was scratched from the edge. The bonding property was evaluated to be poor if the film was delaminated and favorable if not.

3) Wettability:

A mixture of ethylene glycol monoethyl ether and formamide was used to determine the wetting index of each primer layer in accordance with JIS K 6768 as follows. First, multiple test mixtures having ethylene glycol monoethyl ether and formamide at different mixing ratios and known wetting tensions (mN/m) were prepared. Subsequently, the test mixture was dropped onto the surface of the primer layer of the primer-treated film. Following JIS K 6768, the wetting tension (mN/m) of the test mixture that was determined to have wet the surface of the primer layer exactly 2 seconds later was considered to be the wetting index (mN/m) of the primer layer.

Production of Substrate Films a and C-F

"Iupilon E-2000" available from Mitsubishi Engineering-Plastics Corporation was used to produce sheets as follows.

A T-die-equipped melt extruder composed of a twin-screw extruder with a barrel diameter of 32 mm and screw L/D=31.5 was used to bring a molten resin discharged flatly from the tip of the T-die lip into contact with a mirror-finished roll to cool and solidify the resin while applying pressure, thereby molding substrate films (PC films) A-C and F. These substrate films were produced under the conditions of a discharge rate of 20 kg/h, a screw rotation speed of 200 rpm, and a cylinder/die head temperature of 290° C.

The thicknesses of the resulting substrate films were as follows: substrate film A had a thickness of 100 μm (0.1 mm), substrate film C had a thickness of 30 μm (0.03 mm), substrate film D had a thickness of 200 μm (0.2 mm), substrate film E had a thickness of 25 μm (0.025 mm), and substrate film F had a thickness of 300 μm (0.3 mm).

Production of Substrate Films B and G

"Iupilon S-3000" available from Mitsubishi Engineering-Plastics Corporation was used to produce sheets as follows.

A T-die-equipped melt extruder composed of a twin-screw extruder with a barrel diameter of 32 mm and screw L/D=31.5 was used to place a molten resin discharged flatly from the tip of the T-die lip between two mirror-finished rolls to cool and solidify the resin, thereby molding substrate films (PC films) B and G. These substrate films were produced under the conditions of a discharge rate of 20 kg/h, a screw rotation speed of 200 rpm, and a cylinder/die head temperature of 270° C.

The thicknesses of the resulting substrate films were as follows: substrate film B had a thickness of 100 μm (0.1 mm), and substrate film G had a thickness of 50 μm (0.05 mm).

TABLE 1

| | Example 1 | Example 2 | Example 3 | Example 4 | Comparative example |
|---|---|---|---|---|---|
| Kind of primer coating material | 1 | 2 | 3 | 4 | None |
| Wettability (wetting index (mN/m)) | 36 | 34 | 37 | 36 | — |
| Appearance | Favorable | Cissing | Favorable | Favorable | Whitening |
| Bonding property | Favorable | Favorable | Favorable | Delaminated | — |

While the appearance or the bonding property was not necessarily favorable in some examples, their levels were practically not problematic. Moreover, wettability was favorable and whitening of the film surface was suppressed in all of the examples.

Examples 5-20

Adhesive films of Examples 5-20 were obtained by the same fabrication process as Examples 1-4 except that the kind of the primer coating material, the kind and the thickness of the substrate film and the kind of the adhesive agent (adhesive coating material) (components of the adhesive agent layer) were appropriately varied and combined as follows.

<Fabrication of Substrate Film>

Substrate films (PC films) A-G used in Example 5 and the following examples and Comparative examples 2-4 were fabricated as follows.

Furthermore, substrate films a and b, and protective films c and d used in the following examples and comparative examples were as follows.

Substrate Film a

"Iupilon film DF02U" available from Mitsubishi Gas Chemical Company, Inc.

When the cross-section of the double-layer film (PC/PMMA), a laminate of a polycarbonate and PMMA (polymethyl methacrylate), was observed with a microscope, the PC layer had a thickness of 90 μm (refractive index 1.58) while the PMMA layer had a thickness of 35 μm (refractive index 1.49), and the total thickness was 125 μm.

Substrate Film b

"Cosmoshine A4300" available from Toyobo Co., Ltd.

A transparent PET film with a thickness of 100 μm.

Protective Film c

"Cerapeel MDA" available from Toray Advanced Film Co., Ltd.

A mold release PET film with a thickness of 38 μm.

Protective Film d

"Lumirror X30#100" available from Toray Industries, Inc.

A black PET film with a thickness of 100 μm.

<Preparation of Silicone Adhesive Agent (Adhesive Coating Material 2)>

To 100 parts by weight of a base agent (product name KR-3704 available from Shin-Etsu Chemical Co., Ltd.), 50 parts by mass of toluene and 0.5 parts by weight of a platinum catalyst for curing (available from Shin-Etsu Chemical Co., Ltd. product name CAT-PL-50T) were added and thoroughly mixed to obtain a silicone adhesive agent (solution) as adhesive coating material 2.

<Preparation of Urethane Adhesive Agent (Adhesive Coating Material 3)>

To 100 parts by weight of a base agent (available from TOYOCHEM Co., Ltd., product name Cyabine SH-101), 4 parts by weight of a curing agent (available from TOYOCHEM Co., Ltd., product name T-501B) was added and thoroughly mixed to obtain a urethane adhesive agent (solution) as adhesive coating material 3.

<Preparation of Acrylic Adhesive Agent (Adhesive Coating Material 4)>

To 100 parts by weight of a base agent (available from DIC Corporation, product name Finetac CT-3088), 1.5 parts by weight of a curing agent (available from DIC Corporation, product name D-100K) was added and thoroughly mixed to obtain an acrylic adhesive agent (solution) as adhesive coating material 4.

<Preparation of Urethane Adhesive Agent (Adhesive Coating Material 5)>

To 100 parts by weight of a base agent (available from TOYOCHEM Co., Ltd., product name Cyabine SH-205, 3 parts by weight of a curing agent (available from TOYOCHEM Co., Ltd., product name T-501B), was added and thoroughly mixed to obtain a urethane adhesive agent (solution) as adhesive coating material 5.

Example 5

The adhesive film of Example 5 was fabricated in the same manner as Example 1 except that substrate film A was used instead of the polycarbonate film used in Example 1, that adhesive coating material 2 was applied such that the thickness of the coated film was 40 μm when dried, and that the conditions of the hot air circulation dryer were set to 130° C. and 1 minute.

Example 7

The adhesive film of Example 7 was fabricated in the same manner as Example 1 except that substrate film A was used instead of the polycarbonate film used in Example 1, that adhesive coating material 3 was applied such that the thickness of the coated film was 40 μm when dried, that the conditions of the hot air circulation dryer were set to 100° C. and 2 minutes, and that, following the drying step, the mold release PET film (protective film c) was laminated using a hand roller and left to stand at 23° C. for 7 days.

Example 9

The adhesive film of Example 9 was fabricated in the same manner as Example 1 except that substrate film A was used instead of the polycarbonate film used in Example 1, that adhesive coating material 4 was applied such that the thickness of the coated film was 40 μm when dried, that the conditions of the hot air circulation dryer were set to 100° C. and 2 minutes, and that, following the drying step, the mold release PET film (protective film c) was laminated using a hand roller and left to stand at 23° C. for 7 days.

Example 17

The adhesive film of Example 17 was fabricated in the same manner as Example 1 except that substrate film A was used instead of the polycarbonate film used in Example 1, that adhesive coating material 5 was applied such that the thickness of the coated film was 40 μm when dried, that the conditions of the hot air circulation dryer were set to 100° C. and 2 minutes, and that, following the drying step, the mold release PET film (protective film c) was laminated using a hand roller and left to stand at 23° C. for 7 days.

Other Examples

Adhesive films of examples other than those described above were obtained by the same fabrication process as Example 5 except that at least one of the followings were varied: the kind of the substrate film, the thickness of the substrate film, the kind of the adhesive coating material, the thickness of the adhesive layer, and conditions employed for drying and maturing. The compositions of the adhesive films of the respective comparative examples were as shown in Tables 2 and 3 below.

Comparative Examples 2-8

Adhesive films of Comparative examples 2-8 were obtained by the same fabrication process as Example 5 except that at least one of the followings were varied: the kind of the substrate film, presence or absence of the primer coating material, the kind of the adhesive coating material, the thickness of the adhesive layer, and conditions employed for drying and maturing. The compositions of the adhesive films of the Comparative examples 2-8 were as shown in Tables 2 and 3 below.

The evaluation items for the thus-produced adhesive films of Examples 5-20 and Comparative examples 2-8 and the results thereof are shown below.

[Evaluation Methods]

4) Method for Measuring Thickness

A rotary microtome (Leica RM2255 available from Leica Microsystems) was used to cut the section of the film to measure the thickness of each layer from an cross-sectional image obtained with an optical microscope.

5) In-Plane Retardation Re

A substrate film in a size of 150 mm×200 mm (width×run length) was taken from a raw film roll to be used as a measurement sample. A 2D birefringence measurement system (WPA-100 available from Photonic Lattice, Inc.) was used so as to calculate in-plane retardation Re as a mean value of data acquired by an analysis of an area of 100 mm×100 mm or greater in the center part of the measurement sample of the substrate film.

[Measurement Mode]

Three Wavelength Mode

6) Retardation Rth

Five points on a substrate film with a size of 50 mm×50 mm at equal intervals in the width direction of the raw film roll were set as measurement points. An ellipsometer ("M-220" available from JASCO Corporation) was used to measure refractive index nx in the direction that gives the maximum refractive index in the in-plane direction of the measurement sample, refractive index ny in the direction perpendicular to the nx direction in the in-plane direction, and refractive index nz in the thickness direction. From these nx, ny and nz, retardation Re (nm) and retardation in the thickness direction were calculated and mean value of the five points was calculated as Rth (nm).

[Measurement Conditions]

Spectrometer system: double monochromator system

Measurement wavelength: 550 mu

Incident angle: 90°

Bandwidth: 0.5 mm

Response: 2 sec.

Start and end tilt angles of anisotropic analysis stage: −50°, 50°

Measurement intervals: 5°

7) Peel Adhesion (Peel Adhesion to Polycarbonate Resin Plate)

The adhesive films of the examples and the comparative examples were each laminated on a 50 μm (0.05 mm)-thick mirror-finished PC film (substrate film G) in an environment of 23° C. and relative humidity of 50%, and the surface of the adhesive film on the substrate film side was attached and secured to a glass plate using a double-sided tape ("PE cloth double-sided tape WPECX01" available from Sekisui Chemical Co., Ltd.). The thus-laminated mirror-finished PC film was clamped with a gripping tool to measure the peel adhesion between the adhesive layer and the mirror-finished PC film for each of the adhesive films of the examples and the comparative examples by carrying out 180° peel test under the condition of 152 mm/min using a tensile tester (Autograph AGS-X available from Shimadzu Corporation).

This evaluation method was a 180° peel test conducted referring to "Testing methods of pressure-sensitive adhesive tapes and sheets" specified by JIS Z0237, by which peel adhesion of the adhesive layer to the polycarbonate (PC) resin layer was evaluated.

8) Wetting and Spreading

A 150 mm×150 mm cut piece of each of the adhesive films of the examples and the comparative examples was placed on a glass plate such that the adhesive side makes contact with the glass plate to record the process of the adhesive layer adhering to the glass surface from the beginning to the end with a video camera. Once the adhesive layer adhered to the glass surface, the layer of air between the film and the glass plate vanished and the adhered part became transparent. The recorded video was analyzed considering the start of the appearance of the transparent part as the beginning of adhesion and the completion of the spreading of the transparent part as the end of adhesion to measure the time that took from the beginning to the end of adhesion.

Adhesion completed in less than 10 seconds: Favorable

Time that took before the beginning of adhesion was 10 seconds or longer: Slightly poor 9) PC/PI Adhesion in Moist Heat Test PC Adhesion in Moist Heat Test The adhesive films of the examples and the comparative examples were laminated on a 50 μm (0.05 mm)-thick mirror-finished PC film (substrate film G) using a hand roller and then cut into a size of 150×150 mm. The cut piece was placed in a thermo-hygrostat chamber (SH-641 available from ESPEC Corp.), left to stand at 85° C. and 85% RH for 72 hours, taken out and left to stand under the conditions of 23° C. and 50% RH for 30 minutes to observe the appearance.

No wrinkling observed: Favorable

Wrinkling observed: Poor

PI Adhesion Moist Heat Test

The adhesive films of the examples and the comparative examples were laminated on a 40 μm (0.04 mm)-thick mirror-finished PI film using a hand roller and then cut into a size of 150×150 mm. The cut piece was placed in a thermo-hygrostat chamber (SH-641 available from ESPEC Corp.), left to stand at 85° C. and 85% RH for 72 hours, taken out and left to stand under the conditions of 23° C. and 50% RH for 30 minutes to observe the appearance.

No wrinkling observed: Favorable

Wrinkling observed: Poor

The aforementioned PI film was produced as follows. First, 29.034 g (0.056 mol) of 2,2-bis(4-(4-aminophenoxy) phenyl)hexafluoropropane (available from Wakayama Seika Kougyou Co., Ltd.), 18.76 g (0.014 mol) of X-22-9409 (available from Shin-Etsu Chemical Co., Ltd.; dual-end type amino-modified silicone oil) and 50 g of γ-butyrolactone (available from Mitsubishi Chemical Corporation), along with 0.039 g of triethylenediamine (available from Tokyo Chemical Industry Co., Ltd.) and 3.54 g of triethylamine (available from Kanto Chemical Co., Inc.) as catalysts were stirred in a 0.3 L 5-neck glass round-bottomed flask equipped with a Dean-Stark apparatus having a stainless crescent stirrer blade, a nitrogen inlet line and a cooling line, a thermometer and glass end caps at 200 rpm in a nitrogen atmosphere to give a solution. To this solution, 15.692 g (0.070 mol) of 1,2,4,5-cyclohexanetetracarboxylic dianhydride (available from Mitsubishi Gas Chemical Company, Inc.) and 13.5 g of γ-butyrolactone (available from Mitsubishi Chemical Corporation) were each added in batch, and the resultant was heated using a mantle heater to increase the temperature of the reaction system to 200° C. by spending about 20 minutes. The distilled component was collected and the temperature of the reaction system was kept at 200° C. for 3 hours. 78.76 g of N,N-dimethylacetamide (available from Mitsubishi Gas Chemical Company, Inc.) was added and then the resultant was stirred at around 100° C. for about an hour, thereby obtaining homogeneous polyimide varnish with a solid content of 30 mass %.

Subsequently, the resulting polyimide varnish was applied to a PET substrate, held at 100° C. for 30 minutes to allow the solvent to evaporate to give a colorless and transparent self-supporting primary dry film. The film was further fixed to a stainless frame, and dried at 230° C. in a nitrogen atmosphere for 2 hours to remove the solvent, thereby obtaining a PI film with a thickness of 40 μm. The resulting PI film was used in the aforementioned PI adhesion moist heat test.

10) Detaching Property

The adhesive films of the examples and the comparative examples were laminated on a 50 μm (0.05 mm)-thick mirror-finished PC film (substrate film G) using a hand roller and then cut into a size of 150×150 mm. After the cut piece was left to stand under the conditions of 23° C. and 50% RH for 24 hours, the adhesive was peeled off to check the appearance of the 50 μm-thick mirror-finished PC film.

Detachable with no defect in appearance: Favorable

Had defect in appearance: Slightly poor

11) Sticking Processibility

A lamination test was performed in which A4 size adhesive films of the examples and the comparative examples were each laminated on a 50 μm (0.05 mm)-thick mirror-finished PC film (substrate film G) using a film laminator (MP-630 available from MCK Co., Ltd.) to confirm the appearance of the laminate.

[Lamination Conditions]

Lamination speed: 1.8 m/min

Left-right nip pressure: 0.3 MPa

[Evaluation]

Laminated with no defect in appearance: Favorable

Slight defect in appearance or slight curling: Slightly poor

Had defect in appearance: Poor

12) Sticking Processibility on Curved Surfaces

The adhesive films of the examples and the comparative examples were each cut into a size of 25 mm×200 mm, and stuck onto a plastic core (ABS core available from Showa Marutsutsu Company, Ltd., inner diameter 152.5 mmφ, thickness 8 mm) such that the 200-mm side was disposed along the circumferential direction. The resultant was left to stand under the conditions of 23° C. and 50% RH for an hour to thereafter observe the state of bonding.

No delamination from core: Favorable

Delamination from core observed: Poor

13) Heat Resistance Test at 140° C.

Substrate films A-F and substrate films a and b used as the substrates of the adhesive films of the examples and the comparative examples were each cut into a size of 150 mm×150 mm, and placed in an oven (thermostatic convection oven DKN402 available from Yamato Scientific Co., Ltd.) to stand still at 140° C. for 3 hours and taken out. The resultants were left to stand still at room temperature of 23° C. for 30 minutes to observe the presence of curling. Curling level was evaluated by placing the film on a horizontal stage such that the film was curling upward and measuring the height of the curling from the horizontal stage film at the four corners of the film using a ruler and calculating the average curling levels of those at the four corners.

Average curling level is less than 1 mm: Favorable

Average curling level is 1 mm or more: Poor

14) Appearance

Appearance of the fabricated adhesive films of the examples and the comparative examples were observed.

No defect in appearance: Favorable

Streak defect which was not problematic for use: Slightly poor

Appearance defect of film breakage observed: Poor

15) Observation of Rainbow Interference Pattern

The adhesive films fabricated in the examples were laminated on protective film d (black PET film: Lumirror X30 available from Toray Industries, Inc). The resulting laminate films were placed on a horizontal stage to visually evaluate the appearance from the angle of 15° while lighting from the angle of 90° (top) with a lighting apparatus (Technica inverter light 60 AL-60231 available from Technica; equipped with 3 light tubes FL2018/18 available from Technica) provided that the angle in the horizontal direction of the stage was 0°.

A: No rainbow interference pattern observed.

B: Rainbow interference pattern observed.

TABLE 2

| | Example 5 | Example 6 | Example 7 | Example 8 | Example 9 | Example 10 | Example 11 | Example 12 |
|---|---|---|---|---|---|---|---|---|
| Substrate | A | A | A | A | A | A | B | G |
| Thickness of substrate [μm] | 100 | 100 | 100 | 100 | 100 | 100 | 100 | 50 |
| Kind of primer coating material | 1 | 1 | 1 | 1 | 1 | 1 | 1 | 1 |
| Kind of adhesive coating material | 2 | 2 | 3 | 3 | 4 | 4 | 2 | 2 |
| Thickness of adhesive layer [μm] | 40 | 20 | 40 | 20 | 40 | 20 | 40 | 40 |
| Total thickness of adhesive sheet [μm] | 143 | 123 | 143 | 123 | 143 | 123 | 143 | 93 |
| Re [nm] | 31 | 31 | 31 | 31 | 31 | 31 | 16 | 9 |
| Rth [nm] | 52 | 52 | 52 | 52 | 52 | 52 | 132 | 48 |
| Peel adhesion on PC [N/25 mm] | 0.09 | 0.09 | 0.2 | 0.2 | 0.07 | 0.07 | 0.09 | 0.09 |
| Wetting and spreading [sec] | Favorable | Favorable | Favorable | Favorable | Slightly poor | Slightly poor | Favorable | Favorable |
| PI adhesion in moist heat test | Favorable | Favorable | Favorable | Favorable | Favorable | Favorable | Favorable | Favorable |
| PC adhesion in moist heat test | Favorable | Favorable | Favorable | Favorable | Favorable | Favorable | Favorable | Favorable |

| | Example 13 | Example 14 | Comparative example 2 | Comparative example 3 | Comparative example 4 | Comparative example 5 | Comparative example 6 | Comparative example 7 |
|---|---|---|---|---|---|---|---|---|
| Substrate | C | D | A | A | A | b | b | b |
| Thickness of substrate [μm] | 30 | 200 | 100 | 100 | 100 | 100 | 100 | 100 |
| Kind of primer coating material | 1 | 1 | None | None | None | None | None | None |
| Kind of adhesive coating material | 2 | 2 | 2 | 3 | 4 | 2 | 3 | 4 |
| Thickness of adhesive layer [μm] | 40 | 40 | 40 | 40 | 40 | 40 | 40 | 40 |
| Total thickness of adhesive sheet [μm] | 73 | 243 | Unable to apply | Unable to apply | Unable to apply | 140 | 140 | 140 |
| Re [nm] | 12 | 58 | 31 | 31 | 31 | 2990 | 2990 | 2990 |
| Rth [nm] | 54 | 72 | 52 | 52 | 52 | 85 | 85 | 85 |
| Peel adhesion on PC [N/25 mm] | 0.09 | 0.09 | | | | 0.09 | 0.2 | 0.07 |

TABLE 2-continued

| | | | | | |
|---|---|---|---|---|---|
| Wetting and spreading [sec] | Favorable | Favorable | Favorable | Favorable | Slightly poor |
| PI adhesion in moist heat test | Favorable | Favorable | Poor | Poor | Poor |
| PC adhesion in moist heat test | Favorable | Favorable | Poor | Poor | Poor |

TABLE 3

| | Example 5 | Example 15 | Example 16 | Example 17 | Example 18 | Example 19 | Example 20 | Comparative example 8 |
|---|---|---|---|---|---|---|---|---|
| Substrate | A | E | F | A | A | A | a | b |
| Thickness of substrate [μm] | 100 | 25 | 300 | 100 | 100 | 100 | 125 | 100 |
| Kind of primer coating material | 1 | 1 | 1 | 1 | 1 | 1 | 1 | 1 |
| Kind of adhesive agent | 2 | 2 | 2 | 5 | 2 | 2 | 2 | 2 |
| Thickness of adhesive layer [μm] | 40 | 40 | 40 | 40 | 5 | 150 | 40 | 3 |
| Total thickness of adhesive sheet [μm] | 143 | 68 | 343 | 143 | 108 | 253 | 168 | — |
| Re [nm] | 31 | 17 | 87 | 31 | 31 | 31 | 14 | 2990 |
| Rth [nm] | 52 | 46 | 86 | 52 | 52 | 52 | 108 | 85 |
| Peel adhesion to PC [N/25 mm] | 0.09 | 0.09 | 0.09 | 4 | 0.09 | 0.09 | 0.09 | Film breakage occurred |
| Wetting and spreading [sec] | Favorable | Favorable | Favorable | Favorable | Favorable | Favorable | Favorable | |
| PI adhesion in moist heat test | Favorable | Favorable | Favorable | Favorable | Favorable | Favorable | Favorable | |
| PC adhesion in moist heat test | Favorable | Favorable | Favorable | Favorable | Favorable | Favorable | Favorable | |
| Detaching property | Favorable | Favorable | Favorable | Slightly poor | Favorable | Favorable | Favorable | |
| Sticking processibility | Favorable | Poor | Favorable | Favorable | Slightly poor | Slightly poor | Favorable | |
| Sticking processibility on curved surfaces | Favorable | Favorable | Poor | Favorable | Favorable | Favorable | Favorable | |
| Heat resistance test at 140° C. | Favorable | Favorable | Favorable | Favorable | Favorable | Favorable | Poor | |
| Appearance | Favorable | Favorable | Favorable | Favorable | Slightly poor | Favorable | Favorable | Poor |
| Rainbow interference pattern | A | A | A | A | A | A | B | — |

Table 3 shows additional evaluation items of Examples 5 that are not shown in Table 2.

DESCRIPTION OF REFERENCE NUMERALS

10 Adhesive film
12 Adhesive layer
16 Primer layer
20 Substrate film

The invention claimed is:

1. An adhesive film which is a laminate comprising:

a substrate film containing a polycarbonate;

a primer layer laminated at least on a surface of one side of the substrate film; and an adhesive layer laminated on a surface of the primer layer on the other side from the substrate film, wherein the primer layer comprises a UV curable urethane acrylate resin, the substrate film and the primer layer are in direct contact; and the urethane acrylate resin contains at least a mixture of a hexafunctional urethane acrylate and a bifunctional acrylate, wherein the bifunctional acrylate is represented by the following structure:

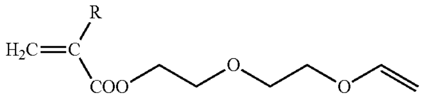

wherein R is hydrogen or a methyl group, or the urethane acrylate resin has an isocyanate-derived structural unit and a structural unit derived from a compound having a (meth) acryloyloxy group and a hydroxy group.

2. The adhesive film according to claim 1, wherein the surface of the primer layer on the adhesive layer side has a wetting index of 30 (mN/m) or more in accordance with JISK6768.

3. The adhesive film according to claim 1, wherein the adhesive layer contains at least one of a silicone adhesive agent, an acrylic adhesive agent and a urethane adhesive agent.

4. The adhesive film according to claim 1, wherein the thickness of the primer layer is 2 μm or more but less than or equal to 10 μm.

5. The adhesive film according to claim 1, wherein the primer layer contains any of an antistatic agent, an UV shielding agent, a near-infrared shielding agent, a light diffusion agent and metal particles.

6. The adhesive film according to claim 1, wherein the thickness of the adhesive layer is 10 μm or more but less than or equal to 100 μm.

7. The adhesive film according to claim 1, wherein the thickness of the substrate film is 30 um or more but less than or equal to 200 μm.

8. The adhesive film according to claim 1, wherein the thickness of the adhesive film is 40 μm or more but less than or equal to 300 μm.

9. The adhesive film according to claim 1, wherein the adhesive film has peel adhesion of 0.001 (N/25 mm) or more but less than or equal to 3 (N/25 mm) in a peel test where the adhesive film is laminated on a polycarbonate mirror-finished film having a thickness of 0.05 (mm) in an environment of 23° C. and relative humidity of 50%, and then peeled off in the 180° direction at 152 mm/min.

10. The adhesive film according to claim 1, wherein the glass transition temperature of the substrate film is higher than 140° C. but lower than 160° C.

11. The adhesive film according to claim 1, wherein the refractive index of the polycarbonate composing the substrate film is 1.55-1.65.

12. A laminate comprising a molded resin body and the adhesive film according to claim 1 attached to the molded resin body.

13. A method for fabricating the adhesive film according to claim 1, the method comprising:

applying a primer solution onto a surface of the substrate film to form the primer layer; and applying an adhesive agent to the surface of the primer layer on the other side from the substrate film to form the adhesive layer.

14. The laminate according to claim 12, wherein the molded resin body is a polycarbonate film.

15. The laminate according to claim 12, wherein the molded resin body is a polyimide film.

* * * * *